United States Patent [19]
Gorman et al.

[11] Patent Number: 6,137,793
[45] Date of Patent: Oct. 24, 2000

[54] REVERSE PATH MULTIPLEXER FOR USE IN HIGH SPEED DATA TRANSMISSIONS

[75] Inventors: Kenneth Gorman, Danville; Mark E. Laubach, Mountain View; Ali Raissinia, Monte Sereno, all of Calif.

[73] Assignee: COM21, Inc., Milpitas, Calif.

[21] Appl. No.: 08/985,571

[22] Filed: Dec. 5, 1997

[51] Int. Cl.[7] .......................... H04L 12/50; H04Q 11/00; H04J 3/02
[52] U.S. Cl. ............................. 370/360; 370/537
[58] Field of Search ..................... 370/537, 389, 370/395, 420, 486, 487, 360; 455/3.1, 4.1, 4.2, 5.1, 8, 12; 348/12, 13, 16

[56] References Cited

U.S. PATENT DOCUMENTS

| | | | |
|---|---|---|---|
| 3,924,187 | 12/1975 | Dormans | 325/52 |
| 5,255,086 | 10/1993 | McMullan, Jr. et al. | 358/86 |
| 5,835,844 | 11/1998 | Stoneback et al. | 455/5.1 |
| 5,841,468 | 11/1998 | Wright | 348/6 |
| 5,864,748 | 1/1999 | Dail | 455/5.1 |
| 5,867,764 | 2/1999 | Williams | 455/5.1 |
| 5,870,134 | 2/1999 | Laubach et al. | 348/12 |
| 5,943,604 | 8/1999 | Chen et al. | 455/5.1 |

FOREIGN PATENT DOCUMENTS

| | | | |
|---|---|---|---|
| 0 549 129 A1 | 6/1993 | European Pat. Off. | H04N 7/173 |
| 0 730 383 A2 | 9/1996 | European Pat. Off. | H04N 7/173 |

OTHER PUBLICATIONS

Laubach, M. "Avoiding Gridlock on the Data Infobahn." *CED: Communications Engineering & Design.* Nov. 1997. pp. 90–94. XP–002100008.

*Primary Examiner*—Alpus H. Hsu
*Assistant Examiner*—Duc Ho
*Attorney, Agent, or Firm*—Wagner, Murabito & Hao LLP

[57] ABSTRACT

A two-way hybrid fiber-coax cable networks offering high-speed broadband communications delivered via a cable modem service. Bi-directional transmissions of packets between the head-end controller (Cable Modem Terminal System) and cable modems (subscriber terminal units) is accomplished using a cable television Media Access Control (MAC) protocol. In Hybrid Fiber-Coax (HFC) networks, the invention provides a Reverse Path Multiplexing (RPM) function permitting the coupling of a large number of return path (plant) RF ports (return ports) to be coupled to a receiver card in the CMTS. One aspect of this invention is that one or more upstream traffic schedulers reside within the CMTS equipment with the responsibility of scheduling the upstream transmissions from cable modems. The cable modems are distributed across many return ports. The data from each cable modem must be successfully received by the head-end controller without being compromised by the effects of noise funneling. The knowledge of when a cable modem will transmit is used to open an RF switch in the RPM.

2 Claims, 16 Drawing Sheets

REVERSE PATH MULTIPLEXER FOR USE IN HIGH SPEED DATA TRANSMISSIONS

FIELD OF THE INVENTION

The present invention pertains to a reverse path multiplexer, especially adapted for use in high-speed broadband communications delivered via virtual private networks over a multi-channel shared CATV media system.

BACKGROUND OF THE INVENTION

The deployment of high speed data services over all-coax and Hybrid Fiber-Coax (HFC) has always been anticipated to follow a straightforward implementation strategy. However, recent industry experience deploying Cable Modem Termination Systems (CMTSs) has uncovered an unforeseen and challenging system engineering issue when deploying new services over HFC systems. The problem is a mismatch in CMTS upstream "ports" to the large number of return path "ports" on HFC systems. Adding more CMTS upstream ports places an operator in an undesirable up front capitalization situation as the additional upstream costs are well beyond the revenue stream during initial sparse deployment.

In general, there are two engineering and business rules to follow when deploying high speed data services on all coax plants: firstly, the new service must be available for any subscriber in the head-end serving area, typically a city or collection of adjoining towns, and secondly, the business model for deployment must incrementally add high-speed data CMTS equipment in track with subscriber demand (capacity) and the associated incremental gains in increased revenue stream.

All coax cable television distribution plants are well suited to the deployment of high speed data services: there are one to few downstream distribution coax trunks leaving the head-end and there are one to few upstream coax trunks entering the head-end. For initial deployment scenarios, a single downstream transmit channel (e.g., single 64 QAM 30 Mbps digital data channel) can service the entire all-coax cable plant by distributing the same downstream signal to all downstream trunks. Similarly, one or more CMTS upstream channels can share the same CMTS upstream port and that port can be coupled to more than one upstream trunk via the use of an RF combiner. One or more upstream data channels can be supported by the CMTS equipment, each separated by frequency. An upstream port is the F-connector which makes the 5–42 Mhz upstream spectrum available to the CMTS equipment.

The use of an RF combiner in the upstream to combine several trunks into one port is of limited use due to the known noise funneling problem (i.e., combining return trunks into a single upstream return port raises the noise floor at the port). The rise in the noise floor is a combination of both background system thermal noise and of externally generated ingress noise. These noise sources collectively form the impairment noise that must be overcome by the upstream data channel for any interactive service: high speed data services, impulse pay per view, etc. The number of upstream trunks that may combined is chiefly limited by the noise characteristics of the return plant. Some all-coax return plant trunks may be noisier than others.

Initial deployment of high speed data services on all coax plants can typically be accomplished using one CMTS for the entire plant. Existing CMTS equipment today come in one of two scalability architectures: "fixed" scale configuration with one downstream port with only one upstream port, or "flexible" scale configuration with one or more downstream ports with one or more upstream ports. Incremental growth to meet new subscriber demand or capacity is different for fixed versus flexible architecture.

At some point in the growth of service deployment, more downstream capacity will be required to meet subscriber demand. In a fixed scale CMTS, a new downstream channel is required for every upstream channel added and vice versa regardless of whether the downstream or upstream channel capacity has been filled by demand. In a flexible scale CMTS, the relationship of the downstream channels to the upstream channels within a single CMTS box are separately scalable, allowing the addition of downstream or upstream channels to follow subscriber demand. In addition, this flexible scale-ability allows for capital expenditures to more closely match revenue growth, and also allows for noise impairment to be better controlled by use of more upstream ports per downstream channel. This latter point is very important in that the cable operator has much more flexibility in managing the recombination of upstream trunks and subsequent noise funneling issues.

When the downstream channel capacity has been exceeded and not enough RF spectrum is available in the cable plant, the operator has the option of upgrading the plant to HFC. The upgrade to HFC will produce more downstream trunks and more upstream trunks. If previous CMTS purchases matched capacity and revenue growth, there is a likelihood that the existing installed CMTS equipment will match the newly available trunks and subsequent ports. Note that in this incremental HFC upgrade scenario, the cable operator has the option to do upgrades only where high-speed data capacity is needed (i.e., where the active subscribers and revenue is coming from). Upgrading the entire plant to HFC is not required.

The ideal world for high-speed data service deployment, business, and growth is to upgrade to HFC only after having established a revenue stream from high-speed data penetration. Since the world is not ideal, new high-speed data services must be deployed on existing all HFC plants. The issue that arises is the matching of CMTS upstream ports to the large number of cable plant upstream ports. The number of return ports is a direct function of node size, the smaller the node, the more ports. The ability to recombine upstream trunks is directly influenced by thermal noise issues of return path lasers and by ingress noise management.

The following example illustrates the return port abundance problem. Assume a small 20K House Holds Passed (HHP) plant is converted to all HFC with a node size of 500 HHP. This yields forty (40) separate returns. Assume that Fabre-Perot (FP) lasers have been used for the upstream returns based on their affordability. FP lasers allow a recombination of four to one (4:1), that is four upstream trunks can be recombined into one upstream port. This reduces the number of upstream ports to ten (10). These ten ports must be support by CMTS equipment.

With fixed scale CMTS equipment ten boxes are required. Worst case economic impact would be that where one box might have supported the entire previous all coax plant, nine additional boxes are now required. With flexible scale CMTS equipment one box is required, provided it supports ten (10) upstream return ports. The one box might have supported the previous all-coax plant and just rolls over to support the new HFC plant. Capital may be needed to purchase additional upstream channel demodulator support for the CMTS. Smaller node sizes increases the number of upstream return trunks. In the above example, if the node size was 2000 HHP instead of 500 HHP, then the number of returns trunks would have been ten (10) not forty (40). Ten return trunks could be recombined into three upstream return ports.

The port mismatch problem gets worse with a larger systems. A typical 50K or 200K HHP system greatly multiplies the number of upstream return ports. In the above 20K HHP example, a system which is 200K HHP is ten (10) times the number of return trunks (i.e. 400). Recombination yields 100 return ports. This is a significant number of ports that must be supported by CMTS equipment.

In the above 200K HHP model with a 500 HHP node size, engineering for initial deployment of high-speed services is faced with a significant challenge of supporting 100 upstream return ports with CMTS equipment. Recall that service must be made available to the entire serving area. The worst subscriber support scenario would be one subscriber per upstream return port. The available revenue from 100 subscribers is not sufficient to purchase CMTS equipment with 100 upstream return channels. Note that in this scenario, one downstream data channel is sufficient to supply services to any subscriber in the serving area until such a time as when demand exceeds the capacity of that single channel.

Recombining return trunks at greater than four to one (4:1) causes noise funneling contribution and reduces the Carrier-to-Noise Ratio (CNR) below a 25 dB margin at the upstream return port. This ratio is being used by several cable operators. Converting the upstream lasers from FP to Direct Feed-Back (DFB) lasers allows the upstream return trunks to be recombined at a ratio of up to ten to one (10:1) which is attractive. If the plant currently has FP lasers, the cost differential to go to DFB is substantial and in most cases prohibitive.

High noise floor interrupts all upstream modulation schemes in an HFC plant. The ability to recombine upstream return trunks is limited by the lowest capable interactive service; for example, impulse pay per view, interactive twoway node management protocols, etc. The recombination problem affects more than just high-speed data services for Internet.

This invention provides a reverse path multiplexing solution that allows CMTS equipment to multiplex upstream returns by recombining data for many returns but not recombining the noise.

SUMMARY OF THE INVENTION

The present invention pertains to two-way hybrid fiber-coax cable networks offering high-speed broadband communications delivered via a cable modem service. Bi-directional transmissions of packets between the head-end controller (Cable Modem Terminal System) and cable modems (subscriber terminal units) is accomplished using a cable television Media Access Control (MAC) protocol. In Hybrid Fiber-Coax (HFC) networks, the invention provides a Reverse Path Multiplexing (RPM) function permitting the coupling of a large number of return path (plant) RF ports (return ports) to be coupled to a receiver card in the CMTS. Key to the operation of this invention is that one or more upstream traffic schedulers reside within the CMTS equipment with the responsibility of scheduling the upstream transmissions from cable modems. The cable modems are distributed across many return ports. The data from each cable modem must be successfully received by the head-end controller without being compromised by the effects of noise funneling. The knowledge of when a cable modem will transmit is used to open an RF switch in the RPM.

In the preferred embodiment, the MAC protocol is based on transmitting fixed sized packets containing Asynchronous Transfer Mode (ATM) based networking however, the invention also easily supports the transmission of variable length packets.

The use of an RPM in cable television high-speed data networking is driven by the need to offer service across the entire cable plant during first service introduction. This means that the entire cable television distribution plant must be covered by CMTS service before even for one customer. The use of the RPM invention allows cable operators to start with a minimal amount of head-end CMTS equipment, thus saving up front capital investment. As service demand grows and subscriber base grows, more receiver cards must be added to the CMTS. The addition of more receiver cards reduces the need for RPM capability, hence this invention allows includes the ability to scale down as receiver cards scale up.

Furthermore, the advances in high speed data cable modem technology require that the reverse path multiplexer be able to switch ports on a packet by packet reception basis regardless of which port the packet is destined to be received on. This means that the speed of the switching elements within the multiplexer be very fast (on the order of 10 microseconds opening and closing time, and getting faster in the future). This fast switch behavior, when combined with a high-speed integrated services data cable protocol, allow the multiplexer to be inserted in the system in a transparent fashion. This allows the cable protocol and cable operator service to continue to offer a mixture of isochronous and non-isochronous traffic on the same upstream channel.

In the preferred embodiment, the capability of the RPM provides an eight upstream port to one receiver port (8:1) capability and includes the ability to split the RPM function to provide dual four upstream port to one receiver port (dual 4:1) capability. The intent of this split capability is to allow the addition of more receiver cards before the use of the RPM is made obsolete. In the preferred embodiment, the RPM has two operating modes: an 8:1 mode and dual 4:1 mode. However, the invention can scale to support and arbitrary number of ports and an arbitrary number of splits.

In one embodiment, the reverse path multiplexer combines upstream plant ports into one receiver port via a multiplexing technique controlled by the traffic scheduler on a receiver card. The reverse path multiplexer contains both equalization and gain control on each return plant port, which are adjusted during RPM installation by a cable technician or under automatic control of a CMTS management system. The purpose of the equalization and gain control on each return plant port is to provide a consistent signal quality to the receiver card regardless of which return port is selected by the RPM.

In another embodiment, the MAC protocol, the traffic scheduler and the RPM control functions of the receiver card allow the traffic scheduler to automatically discover the upstream port during the registration and acquisition process (arrival) for new cable modems. The effect of auto discovery allows the use of the RPM to be transparent to the cable modem or the cable operator, that is, the use of an RPM after initial equalization and gain adjustment, should require no additional administrative effort to configure which upstream port on which a new cable modem has been installed or moved to.

In another embodiment, the initial RPM installation process is overviewed and a method for adding new capacity into the CMTS and the downsizing of the RPM is detailed.

In another embodiment, obsoleted RPMs may be used to provide additional functionality by providing support for a standby receiver card for N:1 receiver redundancy in the CMTS. The continued use of the RPM is this fashion allows the cable operator to continuing making use out of the RPM investment.

BRIEF DESCRIPTION OF THE DRAWINGS

The operation of this invention can be best visualized by reference to the following drawings.

DETAILED DESCRIPTION

Figure 1:
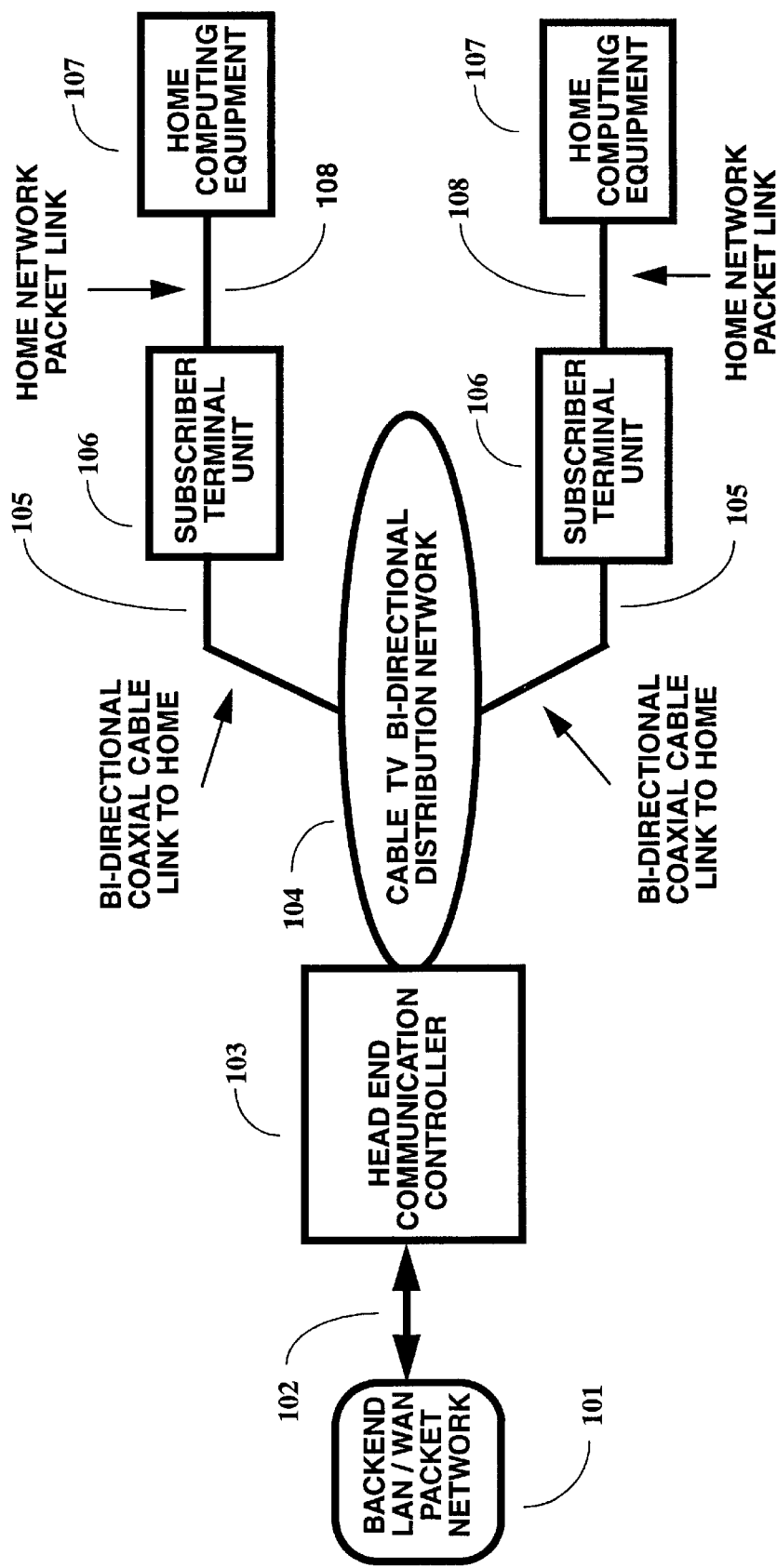
FIG. 1 shows a Headend Communication Controller coupled to a number of STUs in a cable television network.

A system and method for prioritized packet to ATM cell bi-directional transmission between a Headend Communication Controller and multiple station terminal units over a cable network via a Reverse Path Multiplexer is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Residential broad band access network technology based on Asynchronous Transfer Modem (ATM) cell transmission is viable. The capabilities provided by ATM access network support integrated services bandwidth available in excess of those provided by traditional twisted pair copper wire public telephone networks. ATM services to the subscriber home place needed Quality of Service capability closest to the subscriber premises allowing immediate support for Internet services, traditional voice telephony, and digital video services.

The selection of ATM cells as the data-link layer protocol data unit for Cable TV networks has the advantage in that it provides a suitable integrated multiplexing platform capable of supporting both Constant Bit Rate (CBR) scheduling service for isochronous services and the Available Bit Rate (ABR) scheduling service for best effort traffic classes which is well suited for Internet services. In addition, the nature of ATM cell based systems allow for other multimedia applications to be added in the future without requiring iterative changes to the basic ATM protocol. Cable operators can deploy ATM systems as part of an evolutionary path to a fully integrated multimedia bearer service offering.

In one embodiment, a Media Access Control (MAC) protocol layer is layered or coupled to existing physical RF transmission system to create a means to pass cell-based data-link layer information between cooperating subscriber terminal units (STUs—also known as stations or cable modems) and the Headend Communication Controller. In one embodiment, the ATM data-link protocol is layered in a straightforward manner using a slotted approach for both the downstream and upstream RF channels. Downstream traffic management is not distributed and is under the direct control of the Headend Communications controller. Upstream traffic management must be precisely controlled to support the Quality of Service (QOS) needs of the subscriber system on a user demand basis. The choice of the allocation protocol and the placement of the bandwidth ownership intelligence is important. To properly allocate and mange CBR streams in a contention-free manner, the straightforward approach is to place the ownership of the upstream bandwidth with the subscriber unit and by centralizing the allocation intelligence in the network. Communications between the Headend Communication Controller and each subscriber unit is important as permission to use the upstream channel is granted by the Headend Communication Controller whose allocation algorithm must take into account needs communicated to it by each subscriber unit. A grant therefore designates a cable modem via contention, direct, or acquisition grants. The designated cable modem interprets the received grant based on its particular protocol state. These communications between bearer service elements must support at least a subset of the ATM User Network Interface (UNI) traffic management classes: i.e., Constant Bit Rate (CBR), Available Bit Rate (ABR), Variable Bit Rate (VBR), and Unspecified Bit Rate (UBR).

Further, the use of ATM as the basic data-link protocol data unit transmitted over the access network directly supports the use of non-ATM network interfaces with the subscriber home or small business. Specifically, other networking services are transmitted over ATM using standard ATM adaptation layer methods as details in ITU-T specifications, ATM Forum specifications, and Internet Engineering Task Force Internet protocol standards.

Examples of the other network services include, but are not limited to: Ethernet, IP datagrams, digital video using MPEG2 standards, and telephony.

Residential system architectures shall be constructed such that both small and large systems can be built that work in the variety of cable television plants that exist today and allow incremental growth such that deployment of Synchronous Optical NETwork (SONET) technology is easily incorporated in a variety of places within the back-end and distribution networks.

As used herein, the following terms have the following meanings:

"ATM data" refers to cells having a fixed length comprised of a header followed by a payload, which is commonly 48 bytes. The ATM Forum Traffic Management Revision 4.0 specification defines an architecture which supports five ATM service categories: these are Constant Bit Rate (CBR), Real-Time Variable Bit Rate (rt-VBR), Non-Real-Time Variable Bit Rate (nrt-VBR), Available Bit Rate (ABR), and Unspecified Bit Rate (UBR). In addition, various minimum and maximum data bit rates may be specified for each of the service categories. When a user requests services from an ATM network, they select the service category and the desired data rates. CBR directly supports voice telephony and some forms of video-teleconferencing, ABR and UBR directly support Internet data services, and VBR directly supports downstream digital video services.

"A Cable Television Network", also known as a Community Access Television (CATV) network. A traditional coaxial cable tree and branch or Hybrid Fiber-Coax (HFC) network. The downstream signals and downstream channels originate from a CATV head end (or headend). The upstream signals and upstream channels terminate in the CATV headend. Typical CATV signals enter and exit the headend via coaxial cable or combinations of coaxial cable and amplitude modulated (AM) optical fiber. It is envisioned that future CATV distribution systems will incorporate the individual or combined use of either traditional coaxial cable, AM modulated optical fiber, digitally modulated optical fiber, or wireless "last drop" systems. Further, wiring in a headend typically uses traditional coaxial cabling for interconnecting equipment and distribution systems within the headend, it is envisioned that future wiring may consist of individual or combinations of coaxial cable, AM fiber, digital fiber, or wireless techniques.

"Channel spacing" refers to the minimum RF spectral bandwidth spacing needed between communication channels, this is also referred to as the minimum RF spectral bandwidth needed by a communication channel.

"Communications channel" refers to the allocation of a range of radio frequency spectrum for conveying digital information.

"Contention grant" refers to the signal generated by the Headend Communication Controller which gives permission for any STU to transmit in a particular slot.

"Direct grant" refers to the signal generated by the Headend Communication Controller which allows an STU to transmit an ATM cell.

A "downstream signal" embodies both a modulation and demodulation means by which digital information is encoded in a downstream form suitable for transmission over the downstream transmission segment media, transmitted by the headend controller, and ultimately decoded in a manner suitable for reception and processing by the cable modem. The downstream form is one of or a combination of a common variety of modulation techniques suited to the transmission medium such as, but not limited to, Quadrature Phase Shift Keying (QPSK), Quadrature Amplitude Modulation (QAM); or other advanced modulation techniques such as, but not limited to, Code Division Multiple Access (CDMA), Spread Aloha, or other orthogonal based system such as Discrete Multitone (DMT); or other technique suitable to modulating signals through optical fiber; or other technique suitable for wireless last-drop systems. A downstream distribution system may provide conversion from one downstream media to another, on a segment by segment basis. One example is coaxial cable in the headend, to AM fiber (in an HFC system) and back to coaxial cable.

A "downstream channel" embodies the spectral bandwidth, frequency, and other spectral characteristics required for transmitting and amplifying a downstream signal through the downstream media.

In the preferred embodiment, "downstream latency" (or downstream channel pipeline delay) refers to the time delay experienced by a packet as is traverses the downstream channel. Downstream Latency is objectively measured between a transmission reference point in the Headend Communications Controller and a reception reference point in the Subscriber Terminal Unit or Cable modem. Downstream Latency is subjectively measured by users as a perceivable component of response time. Downstream Latency is a combination of both fixed and variable time delay components, including, but not limited to, Forward Error Correction processing delay and over-the-cable propagation delay. Different Forward Error Correction techniques have different amounts of burst protection and subsequently different amounts of end-to-end pipeline delay. In general, the wider the burst protection, the longer the downstream delay. For example, some FEC techniques will provide error correction protection for noise burst sizes of up to 19 microseconds, with a 600 microsecond latency contribution. Other techniques will provide up to 96 microseconds of noise burst protection with 3.75 milliseconds of latency contribution.

"A Headend Digital Communications Controller" or "Headend Controller" or a "Cable Modem Termination System" is a device located in the CATV headend responsible for mastering the communications between itself and a plurality of cable modems. The headend controller is responsible for managing downstream and upstream bandwidth resources which have been assigned to a cable modem service. A downstream channel is serviced by a transmitter port card located within the headend controller. An upstream channel is serviced by a receiver port card located within the headend controller. A port card may service one or more channels. A headend controller may simultaneous provide service and control one or more downstream channels and one or more upstream channels.

A "Home Equipment (HE), or Home Terminal Equipment (HTE)" is a consumer appliance device, typically located in the subscriber's home, which participates in an exchange of digital data with other network devices connected to the Home Network. In the preferred embodiment, a Home Equipment is a two-way interactive digitally networked packet exchange device. Examples of Home Equipment are personal computers, digital telephones, digital televisions, digital answering machines, digital FAX machines, digital network computing appliances, digital interactive game devices, etc. It is envisioned that future Home Equipment will be interconnected to the Home Network by the individual or combined use of either traditional coaxial cable, twisted pair copper cable, fiber optic cable, or wireless links. It is noted that Home Equipment may also be one-way transmit communication devices, such as a burglar alarm system (e.g., surveillance video) or energy management system (remote sensing equipment), which provide sensory management for a subscriber's home. It is noted that Home Equipment may also be one-way receive communication devices, such as legacy television systems, X10 power control stations, toasters, etc. which in the future will receive operational instructions from the Home Network or from other Home Equipment.

A Home Computing Equipment (HCE) is a subset of Home Equipment. In the preferred embodiment, Home Computing Equipment consists of two-way interactive networked packet exchange devices such as personal computers, X Terminals, Unix workstations, etc. It is envisioned that future Home Computing Equipment will be interconnected to the Home Network by the individual or combined use of either traditional coaxial cable, twisted pair copper cable, fiber optic cable, or wireless links.

"Null grant" refers to a signal issued by the headend controller to an STU which instructs the STU to delay entering an idle state.

"Packet data" refers to the components of a protocol packet comprised of a fixed or variable length header and either a fixed or variable length data payload.

"QAM" refers to Quadrature Amplitude Modulation, which is a well known encoding and decoding method for digital data. "16 QAM" refers to a method which produces a digital bit carrying gain of 4 bits per Hertz. "64 QAM" refers to a method which produces a digital bit carrying gain of 6 bits per Hertz. "256 QAM" refers to a method which produces a digital bit carry gain of 8 bits per Hertz.

"Quality of Service" (QoS) is specified using three separate parameters: peak-to-peak cell delay variation (known commonly as jitter); maximum cell transfer delay (also know as latency) which specifics the maximum end-to-end delay tolerance allowed for the connection; and cell lost ratio, this is basically a maximum tolerable discard rate for ATM cells (which directly impacts error loss rate). The user specifies the service category, bandwidth parameters for the service category, and the QoS requirements for each connection. For example, users can specify an ABR or UBR connection with a large maximum end-to-end delay tolerance (very much like the Internet is today), or they may specify an ABR with a very short end-to-end maximum end-to-end delay tolerance, this is needed for interactive gaming over Internet for example, or they may specify constant bit rate for isochronous services which is needed for voice service. Further a downstream connection may specify a VBR connection with desirable bandwidth, but with very low cell loss, very tight jitter bounds, and not much care for end-to-end delay, which is very well suited for downstream digital video. ATM networks support a variety of combinations of services classes and QoS. User requirements may be communicated to the ATM network via User Network Interface (UNI) signaling for Switched Virtual Circuits (SVCs), or via administrative provisioning for Permanent Virtual Circuits (PVCs), or indirectly through other signaling means. It should be noted that indirect methods may be used to communicate user signaling needs, these methods include: the automatic sensing of packets meeting certain criteria, where the packets are examined which flow through an observation and control point in the system, and a change to a particular type of packet service flow (e.g. a voice over IP telephone session starting or stopping) would affect a bandwidth or QoS change to the underlying bearer service; an out of band users interfaces, such as a web server home page, where a user could connect using their standard web browser client software, and affect a QoS change to the services they are receiving over a cable modem to their home; or via a proxy signaling technique, where at the application layer or transport layer (e.g. via an API) a specific protocol message could be interpreted for service class or QoS requirements, where a proxy agent could observe these needs, and produce UNI signaling appropriate for the underlying bearer service. The mechanism by which the subscriber (user) can directly or indirectly affect a change to the QoS of their delivered service will be called the "QoS Knob" is this disclosure. It is noted that the QoS Knob can be implemented by a variety of direct and indirect means as mentioned above.

A "Subscriber Terminal Unit" (STU) or "Station" is a device typically located at the home of a CATV network subscriber. A Subscriber Terminal Unit receives information and instructions via signals received on one or more downstream channels by the headend controller A Subscriber Terminal Unit transmits information and replies via signals one to more upstream channels to the headend controller. Typical CATV signals enter and exit the Subscriber Terminal via coaxial cable. It is envisioned that future Subscriber Terminal Units will exchange information with the headend controller via the individual or combined use of either traditional coaxial cable, AM modulated optical fiber, digitally modulated optical fiber, or wireless links. In the preferred embodiment, a Subscriber Terminal Unit to one or more Home Equipment via one or more physical media links, such as twisted-pair copper (e.g. Ethernet), traditional coaxial cable, fiber optic cable, or wireless; or the Subscriber Terminal Unit connects to the Home Network. It is noted that a Subscriber Terminal Unit may support more than one type of physical link and connect to a digital telephone using a wireless link.

In the preferred embodiment, a "Cable Modem" (CM), is a Subscriber Terminal Unit which connects to one or more Home Computing Equipment (e.g. personal computers) via one or more physical link connections. A Cable Modem supplies a Cable Modem Service to a Home Computing Equipment. A Subscriber Terminal Unit may simultaneously support both a Cable Modem Service together with other services such as a telephone connection to a Home Equipment telephone or a video service to a Home Equipment digital television. In the preferred embodiment, a cable modem receives downstream signals via a single downstream channel and transmits upstream signal via a single upstream channel. It should be noted that a cable modem could support a plurality of downstream channels or a plurality of upstream channels.

"QPSK" refers to Quadrature Phase Shift Keying modulation, which is a well known encoding and decoding method for digital data. QPSK produces a digital bit carrying gain of 2 bits per Hertz.

An "upstream signal" embodies both a modulation and demodulation means by which digital information is encoded in an upstream form suitable for transmission over the upstream transmission segment media, transmitted by the cable modem, and ultimately decoded in a manner suitable for reception and processing by the headend controller. The upstream form is one of or a combination of a common variety of modulation techniques suited to the transmission medium such as, but not limited to, Quadrature Phase Shift Keying (QPSK), Quadrature Amplitude Modulation (QAM); or other advanced modulation techniques such as, but not limited to, Code Division Multiple Access (CDMA), Spread Aloha, or other orthogonal based system such as Discrete Multitone (DMT); or other technique suitable to modulating signals through optical fiber. An upstream distribution system may provide conversion from one upstream media to another on a segment by segment basis. One example is coaxial cable in the home, to AM fiber in the upstream distribution network, and back to coaxial cable in the headend.

"Upstream" refers to the direction of communications form the subscriber home of small business to the CATV head-end.

A "upstream channel" embodies the spectral bandwidth, frequency, and other spectral characteristics required for transmitting and amplifying a upstream signal through the upstream signal through the upstream media.

In the preferred embodiment, "upstream latency" (or upstream channel pipeline delay) refers to the time delay experienced by a packet as is traverses the upstream channel. Upstream Latency is objectively measured between a transmission reference point in the Subscriber Terminal Unit and a reception reference point in the Headend Communications Controller. Upstream Latency is subjectively measured by users as a perceivable component of response time. Upstream Latency is a combination of both fixed and variable time delay components, including, but not limited to, Forward Error Correction processing delay and over-the-cable propagation delay and upstream channel scheduling and access delay. Different Forward Error Correction techniques have different amounts of burst protection and subsequently different amounts of end-to-end pipeline delay. In general, the wider the burst protection, the burst protection, the longer the upstream delay.

In the preferred embodiment, a Media Access Control (MAC) Domain is an association of one or more downstream channels with one or more upstream channels for the purposes of 1) allocating downstream data resources to one or more cable modems, 2) allocating upstream data resources to one or more cable modems, 3) providing a means by which cable modem service requests, management messages, and user data can be received from an upstream channel, and 4) providing a means by which resource grants, management messages, and user data can be transmitted on a downstream channel. A MAC domain has associated with it one or more scheduler m functions which process service requests and user data flow observations in order to allocate downstream and upstream data resources in a fair manner to allow participating cable modems. In general, the downstream and upstream channels of a MAC domain will usually share the same MAC packet formats; i.e., ATM cells, variable length packets, or combinations of ATM cells and variable length packets. There is usually MAC specific overhead information associated with each of the data format types. It is noted that a MAC domain may support the delivery of integrated services: the transport of any combination of voice, video, data, and interactive games. It is noted that a MAC domain may provide service beyond high speed data to cable modems, that is interactive services to television, telephone, and other subscriber home appliances. It is noted that a headend controller may support more than one MAC domain service. In this case, there will be a disjoint (non-overlapping) set of downstream and upstream channels associated with each MAC domain. It is noted that hybrid combinations may exist, although not practical; that is a cable modem may participate in the downstream channel (s) from one MAC domain, yet participate in the upstream channel(s) of another MAC domain.

"A virtual network or Virtual Private Network (VPN) is a facility based on a circuit switched network or packet switched network (with sufficient multiplexing capability) that gives the user the appearance of a private network for a given service (e.g. telephone or data networking). The virtual network is dynamically configured in the sense that the cable operator or the user provides entries into a database used by the cable operator to configure, manage, monitor, and report on the operation of the network. VPNs are characterized by flexibility, a rich set of features, a high degree of operator control, and an ability to be changed quickly based on operator or customer needs. In the preferred embodiment, a VPN is taken to be a group of users sharing a OSI Layer 2 network, e.g. Ethernet or IEEE 802.3 network. One user of the group may be the cable operators networking interface to external routing and/or switching equipment. The number of customers in a VPN group may be as small as one and as many as the number of customers receiving high-speed data services from the cable operator. A customer's Subscriber Terminal Unit or cable modem may belong to one or more VPNs. The customer's home computing equipment may belong to one or more VPNs. The customers home equipment VPN assignments may be different that the Subscriber Terminal Unit or cable modem VPN assignments; that is a Subscriber Terminal Unit or cable modem may support multiple home equipment, which each equipment operating in a different VPN, or combinations of the home equipment operating in the same VPNs. The deployment and configuration of VPNs over a CATV plant are independent of the downstream channels and upstream channels being serviced by the headend controller. The deployment and configuration of VPNs over a CATV plant are independent of the number of MAC domains being serviced by the headend controller. It is noted that the OSI Layer 2 VPN presented here can be extended to support an OSI Layer 3 networking Virtual Logical IP Subnet (VLIS) in a straightforward manner. It is noted that a VPN also applies to circuit switched services, such as telephony and video teleconferencing. In the case of a telephony service VPN, it could be a centrex group or a local PBX group, an Off Premise Extension (OPX) group, etc. In the case of video teleconferencing, a VPN may be used for a local conference group or meeting.

The present invention is a novel extension to the existing Com21 ComUNITY Access product family, including the ComCONTROLLER head-end controller and ComPORT cable modem. The Com21 system is based on the published Com21 MAC protocol: "The UPSTREAMS Protocol for Hyrid Fiber-Coax Networks", which has been submitted to Institute of Electrical and Electronic Engineers (IEEE) 802.14 Standards Cable TV Protocol Working Group and the Society of Cable Television Engineers (SCTE) Data Standards Subcommittee (DSS). It was found that the architecture of the Com21 system and the use of the UPSTREAMS MAC protocol could be adapted to practice the invention. The preferred embodiment of this invention is based on the facilities the UPSTREAMS protocol. However, the invention is equally applicable to any number of different variable length packet protocols.

Referring to FIG. 1, a Headend Communication Controller 103 coupled to the STUs 106 in a cable television network 104 is shown. A backend LAN/WAN packet network 101 transmits and receives packet data to/from the Headend Communication Controller 103 over a network interface 102. These packet data correspond to exclusive or combination of Ethernet, ATM (including SONET, D353, or T1), FDDI, or voice (TR303, TR57, or TR08) protocols. The Headend Communication Controller 103 facilitates communications, both upstream and downstream, and is responsible for all bandwidth management and all resource management, including modulation, frequency, bandwidth, and power assignment. The Headend Communication Controller 103 prioritizes upstream ATM cells. Moreover, it also converts packet data into ATM cells and assigns a virtual connection to each individual ATM cell. This virtual connection information allows individual cells to be prioritized for transmission. In addition, the virtual connection information is used to identify one or more subscriber terminal units (STUs) which are to receive the particular cell. More specifically, the virtual connection information identifies particular circuits within designated STUs to which an individual ATM cell is to be routed. The ATM cells are then sent as one or more RF signals over the bi-directional CATV distribution network 104. The CATV distribution network 104 consists of standard coaxial cable, hybrid fiber-coax (HFC) cable, or fiber optic cables. Cables 105 provide physical links to multiple subscriber terminal units, such as STUs 106. Local packet links 108 are used to establish communications between the STUs 106 and personal computers 107.

In summary, packet data originating from backend LAN/WAN network 101 are sent to the Headend Communication Controller 103 and converted into ATM cells. These ATM cells are prioritized and routed according to their respective virtual connections and sent downstream as RF signal(s) over the CATV network 104. The target STU(s) 106 demodulate the RF signal(s), convert the ATM cells into data packets, and forwards the packet data to PCs 107. Conversely, a number of PCs 107 may forward packet data to their respective STUs 106. The packet data are converted into ATM cells and transmitted upstream in a slotted burst mode over the CATV network 104 to the Headend Communication Controller 103. The ATM cells are then converted back into packet data which are sent on to the LAN/WAN network 101.

Figure 2:
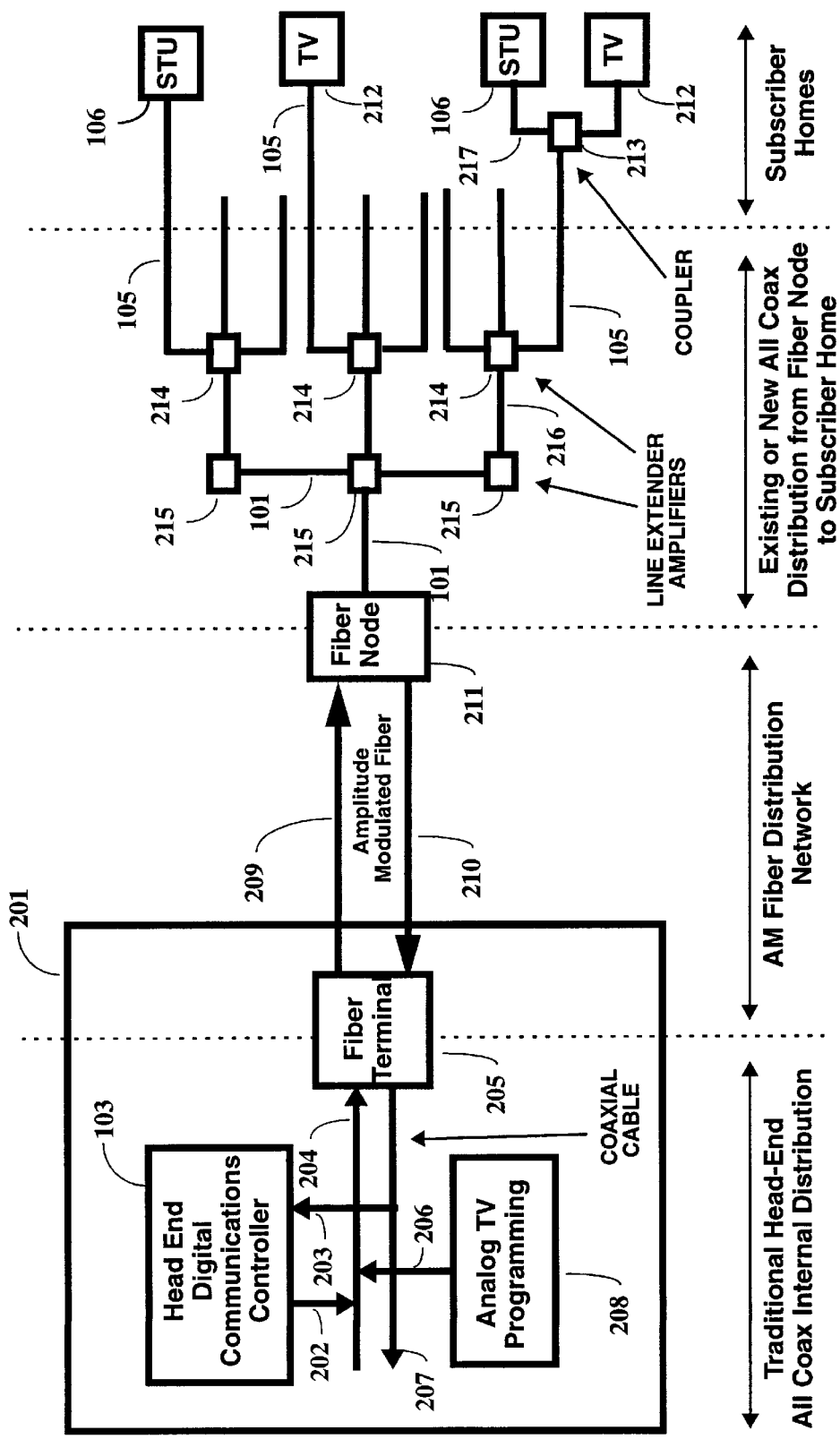
FIG. 2 illustrates a Hybrid Fiber-Coax Cable TV distribution network with a headend network and the placement of the Headend Communications Controller Controller and subscriber terminal units.

FIG. 2 illustrates a Hybrid Fiber-Coax Cable TV distribution network with a headend network 201 and the placement of the Headend Communications Controller Controller 103 and subscriber terminal units 106. The headend network 201 consists of a headend digital communications controller 103 for controlling all digital data traffic, both to the fiber terminal 205 via coaxial links 202 and 204 and from the fiber terminal 205 via coaxial links 203 and 207. Traditional analog TV programming by block 208 can be supported as well by transmitting the RF television signals over lines 206 and 204 to the fiber terminal 205. Fiber terminal 205 is used as an interface to the fiber node 211. Amplitude modulated fiber cables 209–210 provide the connections between a fiber terminal 205 and fiber node 211. A plurality of junctions 213–215 splitting off from fiber node 211 form a coaxial distribution network for routing signals to/from a number of STUs 106 and television sets and set-top boxes 212. For example, STU 106 is connected to fiber node 211 via line 105, line extender/amplifier 214, line 216, line extender/amplifier 215, and line 101. Likewise, a television set or set-top box 212 is connected to the fiber node 211 via coupler 213, line 105, line extender/amplifier 214, line 216, line extender/amplifier 215, and line 101. The delineation between the various stages of a traditional headend all coax internal distribution, analog fiber distribution network, existing or new all coax distribution, and subscriber homes/offices is shown in this figure.

Figure 3:
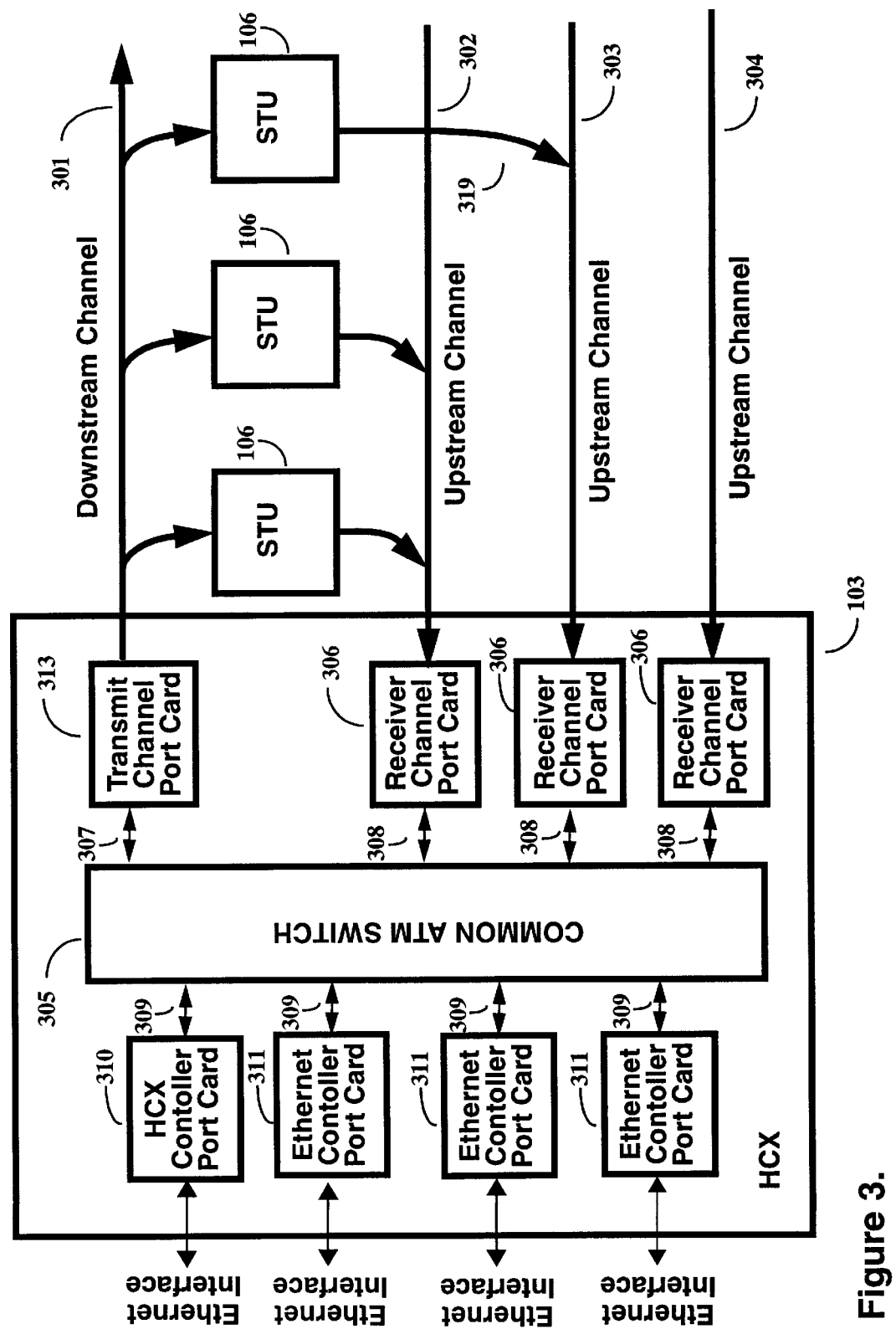
FIG. 3 illustrates the connection of downstream and upstream channels between the Headend Communication Controller and the subscriber terminal units.

FIG. 3 illustrates the connection of downstream 301 and upstream channels 302–304 between the Headend Communication Controller 103 and the subscriber terminal units 106. The Headend Communication Controller (HCX) 103 is comprised of an HCX controller port card 310 which allows an external device/network to direct and monitor the operations of the HCX, including placing of STUs on channels, moving STUs from channel to channel, managing system bandwidth resources, and maintaining the station provisioning database. A number of Ethernet controller port cards 311 (also referred to as Ethernet root controllers) are used to provide an interface between the HCX 103 and a number of Ethernet signals. The Ethernet communications is routed according to the command ATM switch 305. One or more RF signals containing ATM cells are sent by the transmit channel port card 313 to the various STUs 106 via the downstream channel 301. Although only one downstream channel is shown, other embodiments include multiple downstream channels. The receiver channel port cards 306 are used to receive slotted, burst RF signals containing ATM cells from each of the upstream channels. It should be noted that the cards 306, 310, 311, and 313 are all connected to a common ATM switch 305 via links 307–309.

Figure 4:
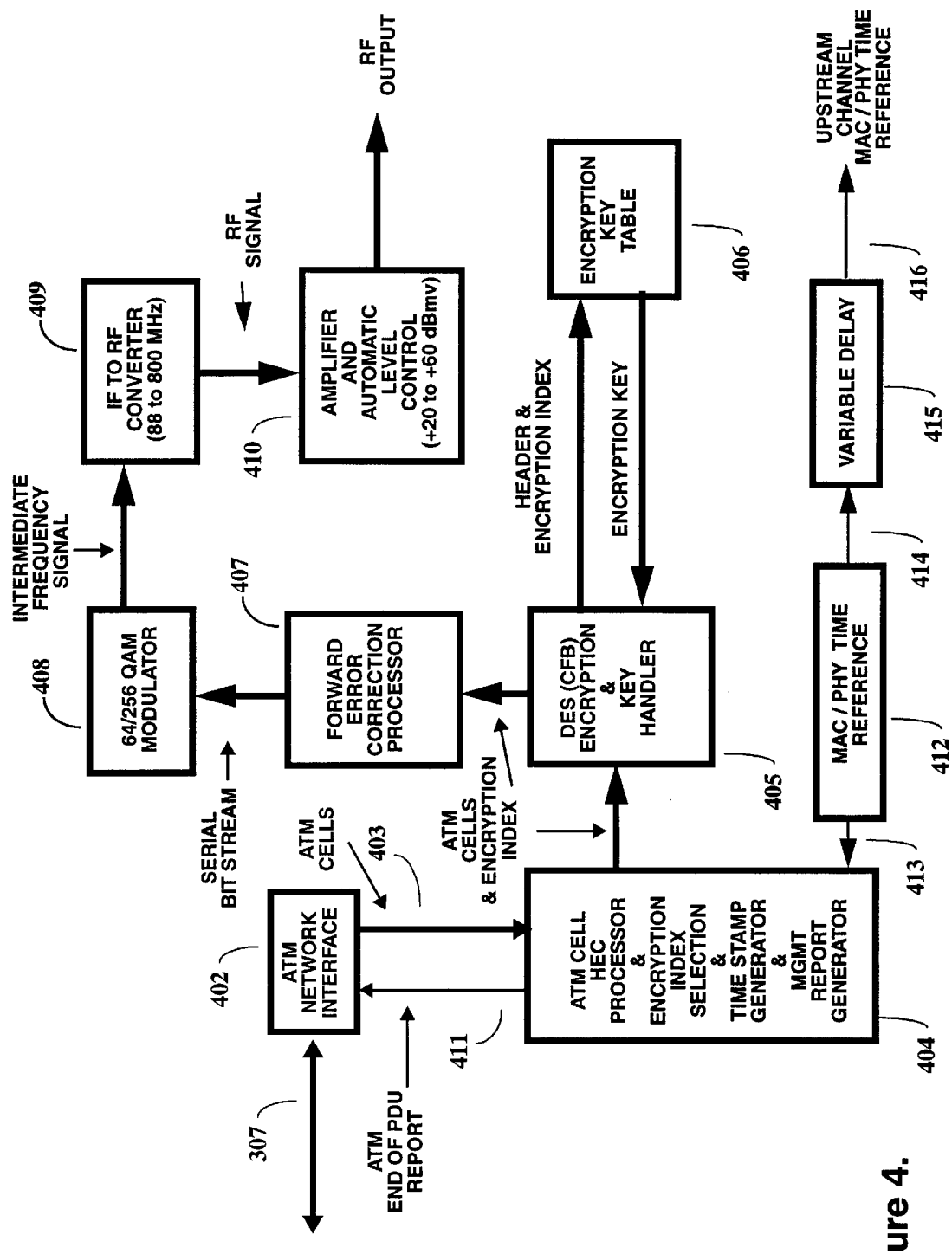
FIG. 4 is a detailed schematic of the circuitry (transmitter channel port card) in the Headend Communication Controller used for processing downstream transmissions.

FIG. 4 is a detailed schematic of the circuitry (transmitter channel port card) in the Headend Communication Controller used for processing downstream transmissions. ATM cells containing packet data arrive from an outside source (e.g., a computer network) via the common ATM switch on line 307. These ATM cells are input to an ATM network interface 402 which converts the cells from a format corresponding to the interconnect of the common ATM fabric to a format corresponding to the card (e.g., a conversion from sonic or ATM25 twisted pair connection to a bus signals appropriate for a printed circuit board). The ATM cells are then sent over line 403 to be processed by the ATM cell processor 404 which performs a Header Error Check (HEC); selects an encryption index; generates a time stamp; and generates a management report. The ATM cells and the encryption index are sent to a Data Encryption Standard (DES) encryption and key handler block 405 which encrypts the ATM cell payload according to an encryption key. The encryption key is supplied by referencing the header and encryption index to an encryption key table 408. A forward error correction processor 407 provides error correction capability (e.g., CRC) for individual ATM cells. The resulting serial bit stream is then modulated by a 64/256 QAM modulator 408. The modulated intermediate frequency (IF) signal is converted to a radio frequency (RF) signal by IF to RF converter 409 for downstream transmission over the CATV network. In the currently preferred embodiment, the RF signal corresponds to 88 to 800 MHz. Before transmission, the RF signal is amplified and automatic level control is performed by block 410. In the currently preferred embodiment, the power level of the RF signal is maintained at +20 to +60 dBmv. The downstream RF channel is managed as a one-to-many system in that the headend has one transmitter and each station has one receiver. There can be many stations participating on that single downstream channel. Each station is addressed separately (unicast), via a group address (multicast), or via an all stations broadcast (broadcast). The details on station addressing are presented later in this description.

Referring back to block 404, the time stamp being generated corresponds to an inverted HEC value at periodic intervals. Alternatively, an ATM cell can be embedded with a unique time stamp in its payload. In. order to generate the time stamp, the time stamp generator receives a timing signal on line 413 from the MAC/PHY time reference block 412. In addition, this same timing signal is delayed by variable delay block 415 and sent via line 416 to the receiver channel port cards operating with the transmitter card in the MAC scheduling domain. The variable delay is set specifically to correlate with the round trip time of the system (e.g., end-to-end delays including the FEC processing time in the head end, downstream propagation time, FEC processing time in the cable modem, processing time through the cable modem, upstream FEC processing time, upstream propagation delay, and upstream demodulating processing time). This delayed timing signal is used by the receiver port cards as part of the ranging scheme.

The ATM End of PDU Report signal on line 411 is generated as part of the management report. Header information corresponding to ATM cells are examined to determine whether that cell contains an End of PDU (Protocol Data Unit) bit that has been set. If the cell's End of PDU bit is set, a report message is generated stipulating that an End of PDU was detected. The report also contains a time stamp and that cell's VPI and VCI. This message is used for scheduling purposes.

The report signal of line 411 consists of one or more messages packaged within one or more ATM cells. The operation of the Management Report Generator 404 has been detailed sufficiently to enable description of the predictive scheduling invention described later in the embodiment. The specific mechanisms used to generate the end of PDU report can be simple, that is anytime an AAL5 end of pdu bit is sampled in the ATM cell flow, or may be more complex to examine only certain VCI values for certain VPI values. Such discrimination would be necessary to only enable this report feature on select VCI pertaining to one or more specific STUs out of the set of all STUs.

Figure 5:
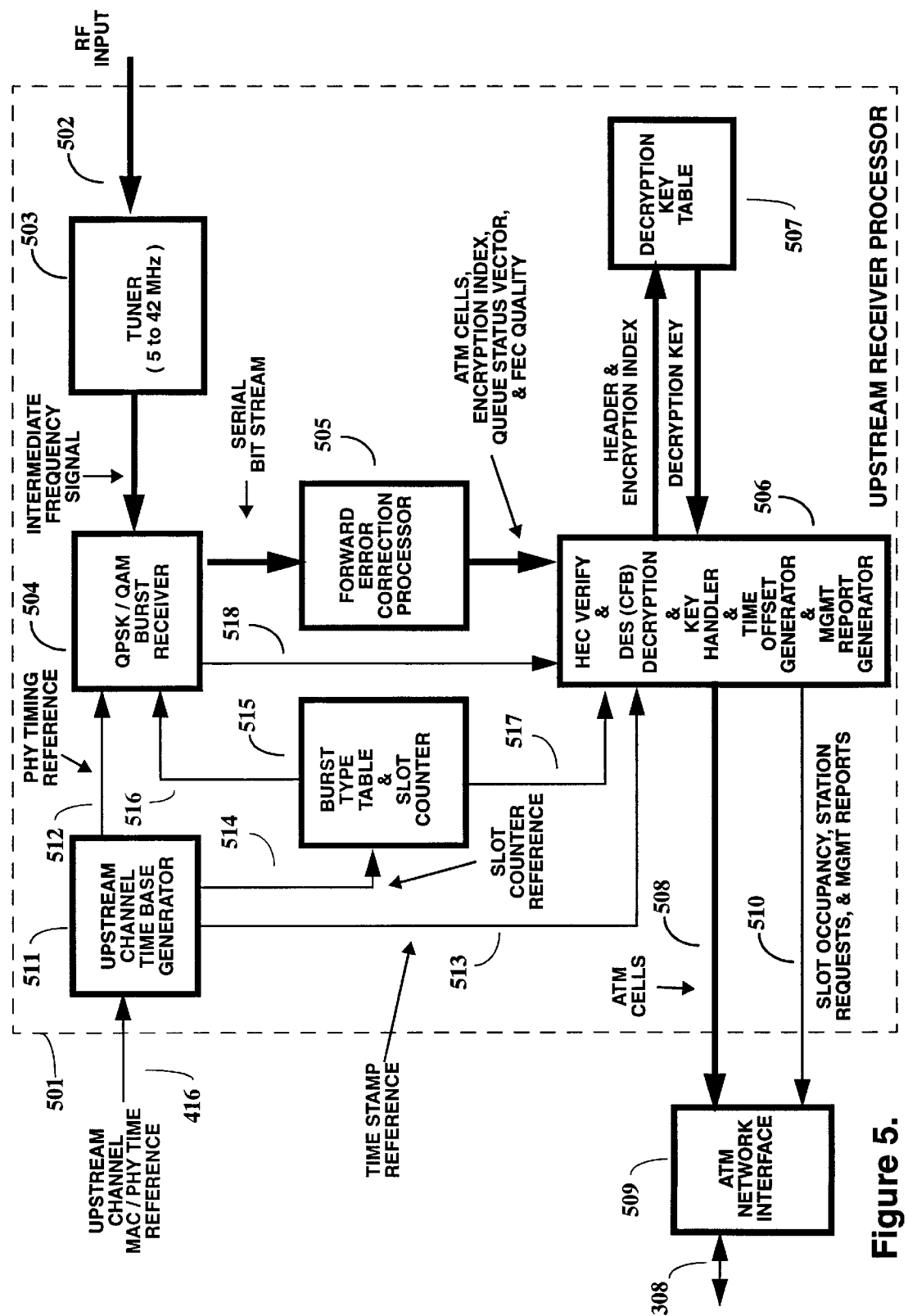
FIG. 5 shows a detailed schematic diagram of the Headend Communication Controller used for processing upstream transmissions.

FIG. 5 shows a detailed schematic diagram of the Headend Communication Controller used for processing upstream transmissions. An upstream receiver processor is shown as block 501. One or more RF signals received from the CATV network are input via RF Input line 502 to the Headend Communication Controller. A tuner 503 is used to tune in the frequencies of interest. In the currently preferred embodiment, this corresponds to 5 to 42 MHz. The IF signal output from the tuner is demodulated by a QPSK/QAM burst receiver 504. The demodulated serial bit stream containing the ATM cells is then sent to the Forward Error Correction Processor 505. The output from FEC processor block 505 includes ATM cells, an encryption index, queue length, and reception quality data (e.g., received error-free, received with correctable error, or received with incorrectable error). This information is sent to the HEC Verify block 506.

Another input to Upstream Receiver Processor 501 is the upstream channel MAC/PHY time reference signal from line 416 which is input to the Upstream Time Base Generator 511. Generator 511 accepts the timing signal from the transmitter card and generates a PHY time signal, a slot time signal, and a time stamp signal. The PHY time signal is input to the QPSK/QAM Burst Receiver 504 on line 512 and is used to perform ranging. The slot time signal is sent to the Burst Type Table and Slot Counter 515 via line 514. Burst Type Table and Slot Counter 515 tracks the number of slots, slot sizes, and the number of slots per burst on the upstream. It also determines the type of burst that is received. This information is sent via line 516 to the QPSK/QAM Burst Receiver 504 so that it can set its demodulator and equalizer to specifically receive that particular burst type. The HEC Verify block 506 also receives this information.

The HEC Verify Block 506 also includes a DES (CFB) Decryptor, a Key Handler, a Time Offset Generator, and a Management Report Generator. The HEC Verify Block 506 outputs a header and encryption signal to the Decryption Key Table; ATM cells to the ATM Network Interface 509 on line 508; and a signal containing slot occupancy, station requests, and management reports also to the ATM Network on line 510. The header and encryption index signal is used to index encryption key table 507 in order to determine the proper encryption key. Based thereon, the HEC Verify block 506 can output ATM cells to the ATM network interface 509 which converts the data into packets for output to an external device or network via line 308. The slot occupancy, station requests, and management reports signal on line 510 contains information regarding whether a slot assigned to a particular cable modem for transmission was actually utilized by that cable modem and whether, during a contention opportunity, a cable modem transmitted, no cable modem transmitted, or RF energy detected, no discernible data occurred. The power level of a slot that was received is supplied by the QPSK/QAM Burst Receiver 504 on line 518. In addition, station requests generated as part of the normal request grant protocol are included in the management reports. These station requests include those requests which arise in contention opportunities as well as "piggybacking" requests which are formed in response to the queue length identifier of block 505.

Figure 6:
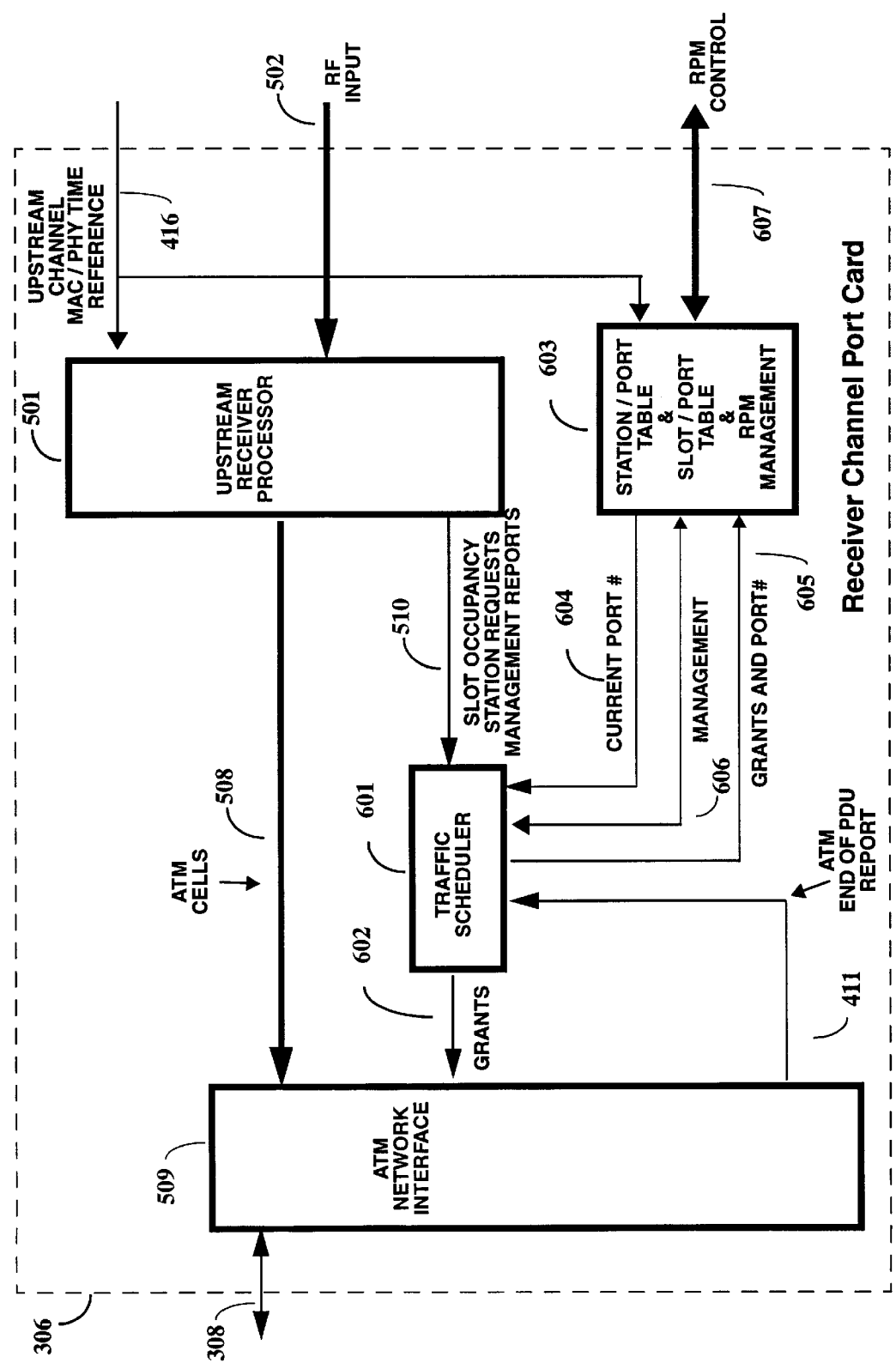
FIG. 6 is a schematic diagram of a Receiver Channel Port Card.

FIG. 6 is a schematic diagram of a Receiver Channel Port Card 306. As described above, the RF input is fed into the Upstream Receiver Processor 501 via RF Input Line 502. ATM cells on line 508 are input to the ATM Network interface 509 from the Upstream Receiver Processor 501. The slot occupancy reports, station requests and management reports from the Upstream Receiver Processor 501 are fed via line 510 to the Traffic Scheduler 601 for scheduling purposes. Traffic Scheduler 601 tracks slot occupancy and traffic scheduling issues related to traffic from the STUs (106) to the head end controller 103. The Traffic Scheduler 601 is also used to track whether a particular STU 106 did transmit in a particular slot number and accepts ATM End of PDU reports via line 411. The ATM End of PDU reports generated by the ATM HEC Processor and ATM Cell Scheduler informs the Traffic Scheduler 601 of downstream traffic. More significantly, the Packet Summary Report which contains specific packet information (e.g., TCP downstream data) is used as a downstream traffic indication by the Traffic Scheduler 601. All this information is utilized by the Traffic Scheduler 601 to issue grants on line 602 to the ATM Network Interface 509. These grants are passed on downstream via interface 308 to the STUs 106 giving them permission to use upstream resources.

Traffic Scheduler 601 is also coupled to RPM Control Function Module 603. In accordance with the present embodiment, RPM Control Function Module 603 controls a Reverse Path Multiplexer (RPM) comprising a plurality of ports. RPM Control Function Module 603 is coupled to line 607. Line 607 is used by the RPM Control Function Module 603 to send management information to RPM and control the RPM port selection. RPM Control Function Module 603 further comprises a station/port table module, a slot/port table module and a RPM management function module.

The purpose of the station/port table module is to provide a map between station identifiers and RPM port numbers. Under direction of the Traffic Scheduler 601 via management signals on line 606, the station/port table module records or sets up a table of entries that indicate a station identifier is associated with a RPM port number. The information in the station/port table is used as part of the scheduling function, such that when the Traffic Scheduler 601 issues a grant to a particular station, the RPM Control Function Module 603 will issue a signal to the RPM to open the appropriate port on the RPM based upon the corresponding station number entry in the station port table. The Traffic Scheduler 601 also provides RPM Control Function Module 603 with information regarding grants and associated port numbers via line 605 and management control signals via line 606. RPM Control Function Module 603 reports which port in the RPM is currently being opened to the Traffic Scheduler 601 via line 604.

RPM Control Function Module 603 also maintains a slot/port table which tracks what port is open during a particular slot. As RPM Control Function Module 603 signals the RPM to open a port, the RPM Control Function Module 603 also reports that port number back to the Traffic Scheduler 601. The Traffic Scheduler 601 utilizes this information in identifying stations when they first come on the system and notifying the RPM Control Function Module 603 that an entry should be made in the station/port table module, such that a particular port number should be assigned to the new station. The particular port number assigned to the new station is the port number the new station first accesses the system through. In accordance with the present invention the Traffic Scheduler 601 and RPM Control Function Module 603 perform this assignment automatically without any further intervention by humans.

RPM Control Function Module 603 also maintains a RPM Management Module to control the RPM including equalization and gain control. The control of the RPM by RPM Control Function Module 603 is a real time activity conducted in conjunction with a slot counter. For example if slot #5 were arriving at the RPM via RF Input line, the RPM Control Function Module 603 would have to signal the RPM to open a port for slot 5. Thus, RPM Control Function Module 603 has to be able to track the slot sequences and signal the RPM to open the correct port at the appropriate time. In order to accomplish this RPM Control Function Module 603 tests inputs from signal 614 the upstream channel MAC/PHY time reference.

It should be appreciated that there are other management functions not shown in the present embodiment so as not to unnecessarily obscure the invention. For example, the management signal from the Traffic Scheduler 601 can also control various aspects of the RPM with regards to monitoring some status activity but also controlling some set up and equalization functions in the RPM. Furthermore, although the preferred embodiment shows the RPM management module to be part of the Receiver Channel Port Card, other implementations may place the control logic elsewhere (e.g., in the CMTS) and still achieve equivalent functionality. Moreover, the RPM controller can be used to control multiple RPMs.

Figure 7:
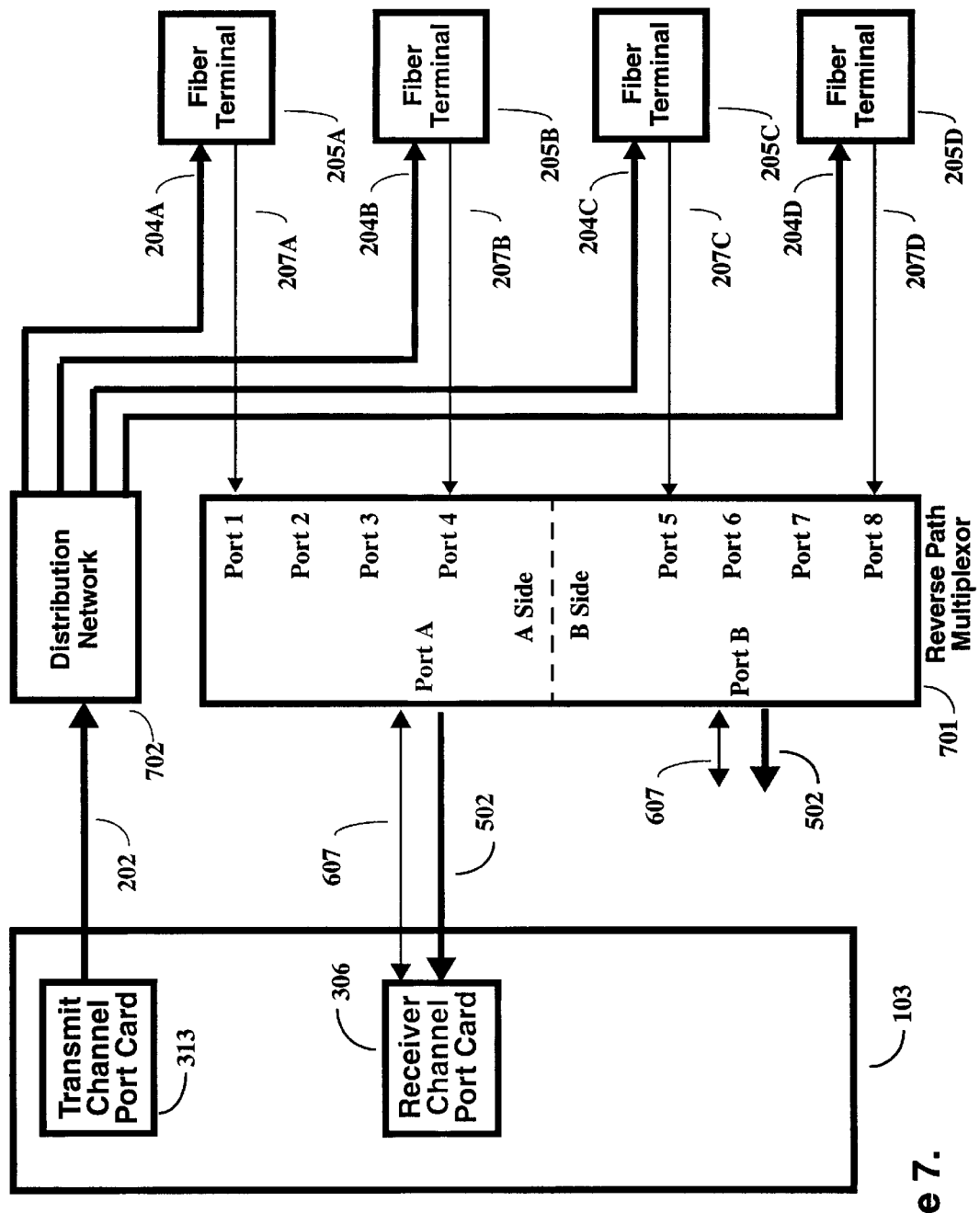
FIG. 7 shows one embodiment of a Reverse Path Multiplexer (RPM).

FIG. 7 shows one embodiment of a Reverse Path Multiplexer (RPM) 701. In the present embodiment, RPM 701 functions as and 8 to 1 multiplexer. RPM 701 is coupled to a Headend Communication Controller 103. Headend Communication Controller 103 comprises a Transmit Channel Port Card 313 and a Receiver Channel Port Card 306. Transmit Channel Port Card 313 is coupled to a Distribution Network 702 via coaxial link 202. Distribution Network 702 feeds downstream signals to the fiber terminals 205A through 205D via coaxial link 204A through 204D. Return plant traffic from fiber terminals 205 A through 205D are coupled to Reverse Path Multiplexer 701 via coaxial links 207A through 207D. Each of fiber terminals 205 A through 205 D are coupled to a different port in RPM 701. RPM 701 is also coupled to Receiver Channel Port Card 306 via line 607 and interface line 502. As previously indicated the Receiver Channel Port Card 306 controls the RPM 701 via signals on line 607. The present embodiment is depicted with only Port 1 coupled to fiber terminal 205 A, Port 4 coupled to fiber terminal 205 B, Port 5 coupled to fiber terminal 205 C and Port 8 coupled to fiber terminals 205 D, so as not to unnecessarily obscure the invention. It should be appreciated that other embodiments of the [resent invention may have other combinations of ports and fiber terminals connected to each other.

In the present embodiment RPM 701 has an A side and a B side and can operate in either of two modes. Side A is a 4 to 1 multiplexer and Side B is a 4 to 1 multiplexer. In one of the modes Side A and Side B are linked together in a manner that effectively provides an 8 to 1 multiplexer. In the other mode Side A and Side B operate separately as two (or dual) 4 to 1 multiplexers. When RPM 701 is in a full 8 port mode, Port A effectively controls Ports 1 through 8. In a spilt port mode Port A controls Ports 1 through 4 and Port B controls Ports 5 through 8. The present embodiment depicts a maximum of 8 inputs to 1 output configuration. It should be appreciated that one skilled in the art will readily recognize that other embodiments of the present invention may involve other multiplexer configurations. For example, a 16 to 1 multiplexer or dual 8 to 1 multiplexers. In the present embodiment the RPM 701 is acting as an input multiplexer. It should also be appreciated that there are other modes of operation in which RPM 701 acts as an output multiplexer (see below).

Controls signals are sent over line 607 to Port A which controls all of the RPM Ports 1 through 8. RPM Control Function Module 603 can selectively gate open Port 1, Port 2, Port 3 or Port 4. In the present mode of an 8 to 1 multiplexer only one of the Ports 1 through 8 will be open at a time. However, in a split port mode in which Port A and Port B operate as dual 4 to 1 multiplexers, a Port from Side A (e.g. one of Ports 1 through 4) may be open and a Port from side B (e.g. one of Ports 5 through 8) may be open simultaneously. It should be appreciated that in other embodiments there may be reasons, such as diagnostic or data management, to have multiple ports open at the same time.

Figure 8:
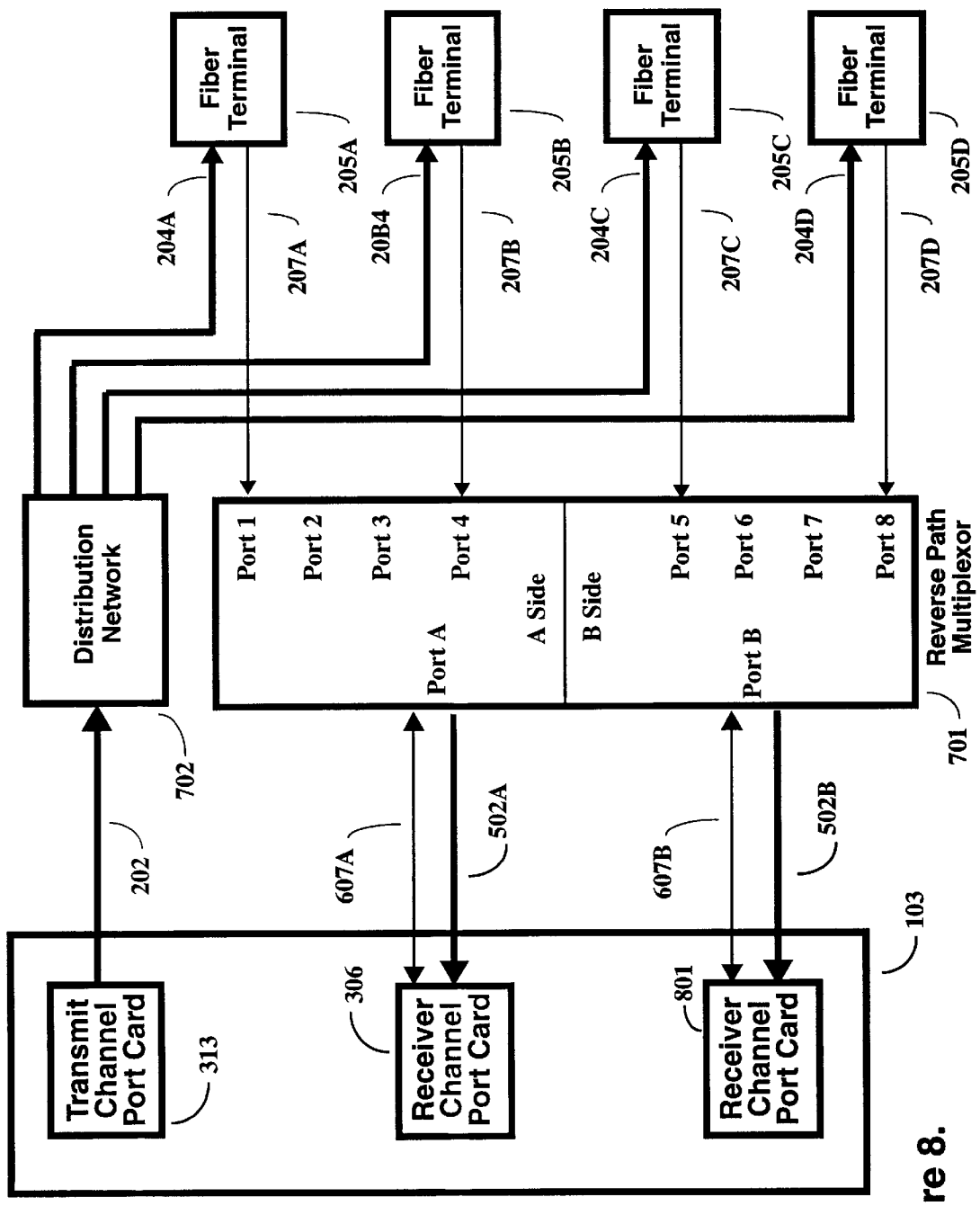
FIG. 8 shows the same RPM operating in split mode.

FIG. 8 shows the same RPM 701 operating in split mode. In this configuration Port A is coupled to line 607A and RF Input line 502A. Port B is coupled to line 607B and RF Input line 502B. Port A and Port B are coupled to different Receiver Port Channel Cards. Receiver Channel Port Card 306 provides control information over line 607A coupled to Port A and controls Side A (Ports 1,2,3, and 4). Receiver Channel Port Card 801 provides control information over line 607B coupled to Port B and controls Side B (Ports 5, 6, 7, and 8). The two sides, A and B, operate independently in this mode.

The dual mode or multi "sided" feature of RPM 701 is important because as capacity out on the cable plant grows in terms of data carrying capacity, at some point either the traffic handling capacity of the system or the data carrying capacity of Receiver Channel Port Card 306 will be exceeded. In order to add more capacity into the system, but not create a noise funneling situation, a second channel receiver card can be added into the system and the RPM 107 can be operated in split mode. When the operation of the RPM is split in this manner, it effectively adds another Receiver Channel Fort Card worth of channel capacity to approximately half the ports. More appropriately it adds more data carrying capacity for half the population of stations. Thus, this method of operation increases the overall data carrying capacity of the system and permits incremental growth without having to throw out RPM 701.

Figure 9:
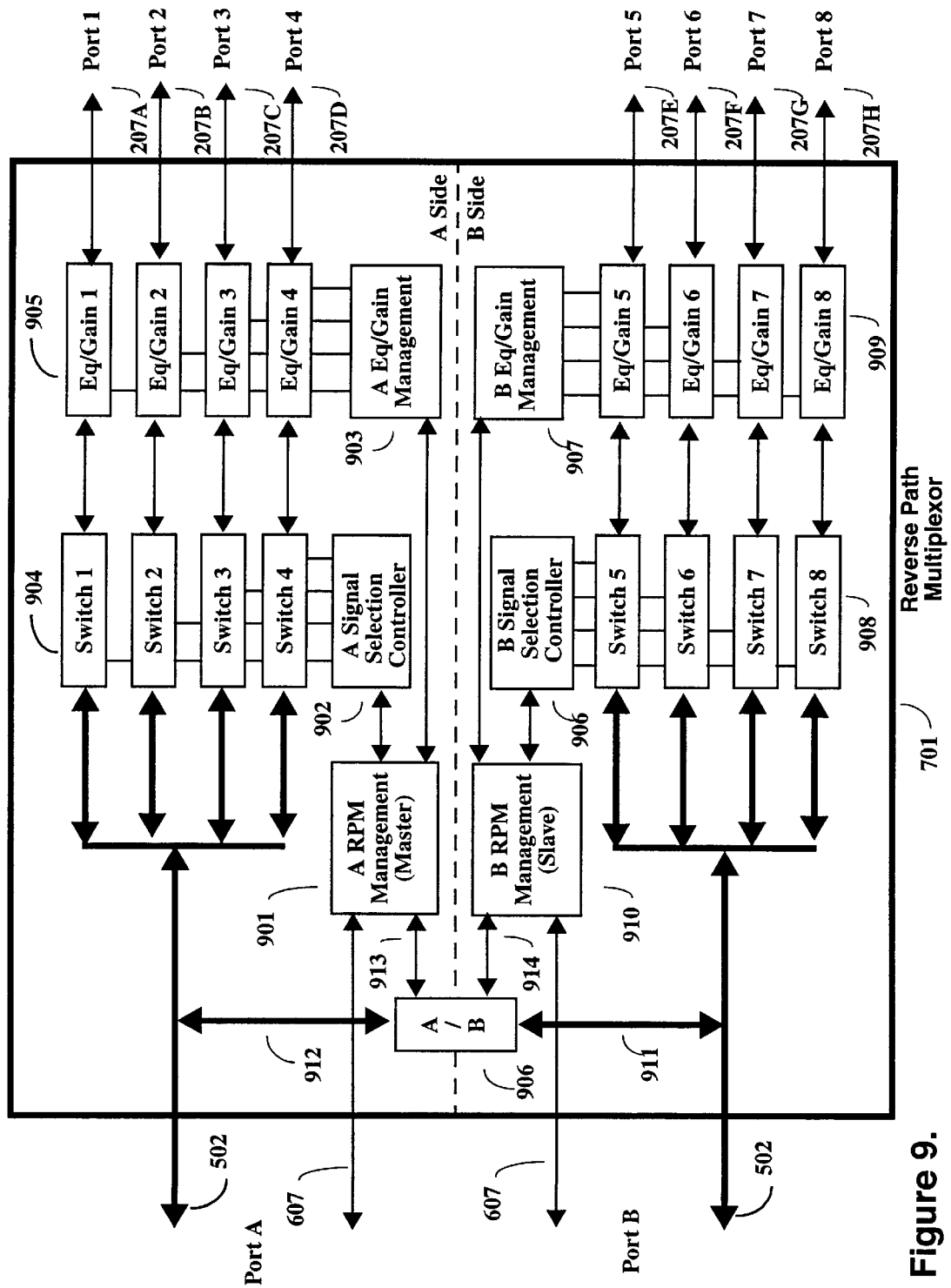
FIG. 9 shows one embodiment of an internal functional schematic of RPM.

FIG. 9 shows one embodiment of an internal functional schematic of RPM 701. As previously indicated RPM 701 comprises a side A and a side B which are coupled by A/B block 906. Side A comprises an RPM Management (Master) 901, a Signal Selection Controller component 902, an Equalizer/Gain (Eq/Gain) Management component 903, Switch Bank 904 and Equalizer/Gain Bank 905. Switch Bank 904 further comprises Switch 1, Switch 2, Switch 3, and Switch 4. Equalizer/Gain Bank 905 comprises Equalizer/Gain 1, Equalizer/Gain 2, Equalizer/Gain 3 and Equalizer/Gain 4. Side B comprises B RPM Management (Slave) 910, B Signal Selection Controller component 906, B Equalizer/Gain Management component 907, Switch Bank 908 and Equalizer/Gain Bank 909. Switch Bank 908 further comprises Switch 5, Switch 6, Switch 7, and Switch 8. Equalizer/Gain Bank 909 comprises Equalizer/Gain 5, Equalizer/Gain 6, Equalizer/Gain 7 and Equalizer/Gain 8. As can be seen, Ports 1–4 are respectively coupled via lines 207A–D to Eq/Gain 1–4 blocks 905.

A RPM Management (Master) 901, is coupled to A Signal Selection Controller component 902, A Equalizer/Gain Management component 903, interface line 607 and line 913. A Signal Selection Controller component 902 is coupled to Switch 1, Switch 2, Switch 3, and Switch 4 of switch Bank 904. A Equalizer/Gain Management component 903 is coupled to Equalizer/Gain 1, Equalizer/Gain 2, Equalizer/Gain 3 and Equalizer/Gain 4 of Equalizer/Gain Bank 905. Switch Bank 904 is coupled to Equalizer/Gain Bank 905, such that Switch 1 is coupled to Equalizer/Gain 1, Switch 2 is coupled to Equalizer/Gain 2, Switch 3 is coupled to Equalizer/Gain 3, and Switch 4 is coupled to Equalizer/Gain 4. Switch 1, Switch 2, Switch 3, and Switch 4 are also coupled to line 502 which is coupled to line 912. Equalizer/Gain 1 is coupled to Port 1 and Equalizer/Gain 4 is coupled to port 4. Likewise, Ports 5–8 are respectively coupled via lines 207E–H to Eq/Gain 5–8 blocks 909.

B RPM Management (Master) 910, is coupled to B Signal Selection Controller component 906, B Equalizer/Gain Management component 907, interface line 607 and line 913. B Signal Selection Controller component 906 is coupled to Switch 5, Switch 6, Switch 7, and Switch 8 of switch Bank 908. B Equalizer/Gain Management component 907 is coupled to Equalizer/Gain 5, Equalizer/Gain 6, Equalizer/Gain 7 and Equalizer/Gain 8 of Equalizer/Gain Bank 909. Switch Bank 908 is coupled to Equalizer/Gain Bank 909, such that Switch 5 is coupled to Equalizer/Gain 5, Switch 6 is coupled to Equalizer/Gain 6, Switch 7 is coupled to Equalizer/Gain 7, and Switch 8 is coupled to Equalizer/Gain 8. Switch 5, Switch 6, Switch 7, and Switch 8 are also coupled to line 502 which is coupled to line 911. Equalizer/Gain 5 is coupled to port 5 and Equalizer/Gain 8 is coupled to port 8.

In one embodiment, an RPM Management (Master) 901 effectively controls all of the ports 1 through 8 when the RPM is operating as an 8 to 1 multiplexer. The RPM Management (Master) 901 accepts control information line 607 coupled to Port A. A RPM Management (Master) 901 utilizes this information in managing A Signal Selection Controller component 902 to open or close Switch 1, Switch 2, Switch 3, or Switch 4 of Switch Bank 904. In the preferred embodiment, switch 904 is a solid state RF device which permits or denies the transmission of an RF signal from one side of the switch to the other. When the switch is permitting the transmission of an RF signal, it is "selecting" the RF signal, or the RF signal is "selected". The characteristics of the RF switch are that is a fast noiseless (bounceless) switch which when selected permits the transmission of the RF signal within 10 microseconds of opening. Conversely, when de-selected, the switch denies the transmission of the RF signal within 10 microseconds. In the preferred embodiment the switch is used to permit and deny the transmission of RF signals in the passband range of 5 to 42 Mhz. One skilled in the art will recognized that faster and slower acting switches may be used by this invention, that other than solid state technology may be used, and that other passband frequencies may be permitted, including but not limited to several passbands being selected simultaneously by one switch.

A RPM Management (Master) 901 also controls A Equalizer/Gain Management component 903. A Equalizer/Gain Management component 903 controls the equalization setting in each of Equalizer/Gain 1, Equalizer/Gain 2, Equalizer/Gain 3 and Equalizer/Gain 4 of Equalizer/Gain Bank 905. Thus, for each of Port 1, Port 2, Port 3 and Port 4, the corresponding Equalizer/Gain 1, Equalizer/Gain 2, Equalizer/Gain 3 and Equalizer/Gain 4 is adjusted, such that the output, as seen on RF Input line 502 coupled to Port A, would have the same equalization for each one of the lines being switched in. This is very important for the operation of demodulating both QPSK signals and Quadrature amplitude modulated signals for the purpose of making sure a receiver card 306, which is receiving signals off of line of RF Input line 502, will see the same quality of RF signal for each one of the ports that are open. Thus, RPM 701 can handle expected varying plant condition since each one of the equalizers will be tuned separately.

As indicated above, A RPM Management (Master) 901 effectively controls all of the ports 1 through 8 when the RPM is operating as an 8 to 1 multiplexer by acting as a master to B RPM management (slave) 910. B RPM management (slave) 910 in turn controls the components of the B side in a manner similar to the manner in which A RPM Management (Master) 901 controls the A side. That is, B RPM Management (Master) 901 accepts control information from A RPM Management (Master) 901. B RPM Management (Slave) 910 utilizes this information in managing B Signal Selection Controller component 906 to open or close Switch 5, Switch 6, Switch 7, or Switch 8 of switch Bank 908. B RPM Management (Slave) 910 also controls B Equalizer/Gain Management component 907. B Equalizer/Gain Management component 907 controls the equalization setting in each of Equalizer/Gain 5, Equalizer/Gain 6, Equalizer/Gain 7 and Equalizer/Gain 8 of Equalizer/Gain Bank 909. Thus, for each of Port 5, Port 6, Port 7 and Port 8 the corresponding Equalizer/Gain 5, Equalizer/Gain 6, Equalizer/Gain 7 and Equalizer/Gain 8 is adjusted such that the output as seen on line 502 on Port B would have the same equalization for each one of the lines being switched in.

The A/B split mode function is controlled by A/B component 906. In present mode of an 8 to 1 multiplexer, control signals come in only over Port A via line 607 to control the A RPM Management (Master) 901 which in turn controls the B RPM Management (Slave) component 910 via 913, A/B component 906 and line 914. The A/B component also takes the RF signals that appear on 911 and couples them to RF signals on 912. Thus, the two 502 outputs for Port A and Port B are effectively coupled, since all of the signals will appear on Port A for both the A and B sides. In other words, the capability of the RPM provides an eight upstream port to one receiver port (8:1) capability and also includes the ability to split the RPM function so that it provides dual four upstream port to one receiver port (dual 4:1) capability For example, Ports 1–4 operate through receiver Port A. Concurrently, Ports 5–8 can independently operate through receiver Port B. The intent of this split capability is to allow the addition of more receiver cards before the use of the RPM is made obsolete. Note that this invention can scale to support any arbitrary number of ports and any arbitrary number of splits.

In the preferred embodiment, all RF links are unidirectional. However, the function of the RPM can be extended to make all RF links bi-directional. In addition, all the links or lines carrying RF signals are bi-directional. Therefore, Port A RF Input line 502, which was described previously as an output to Receiver Channel Port Card 306, could also act as an input from another signal source. In such a case, the signal would be output on Port 1, Port 2, Port 3, Port 4, Port 5, Port 6, Port 7 or Port 8, depending on the configuration of the switches, enabling the RPM 701 to operate in both directions. In the present embodiment the operation of the A/B component is administratively controlled during installation. The RPM has a manual switch that controls whether the RPM will operate in 8 to 1 mode or dual 4 to 1 mode.

Figure 10:
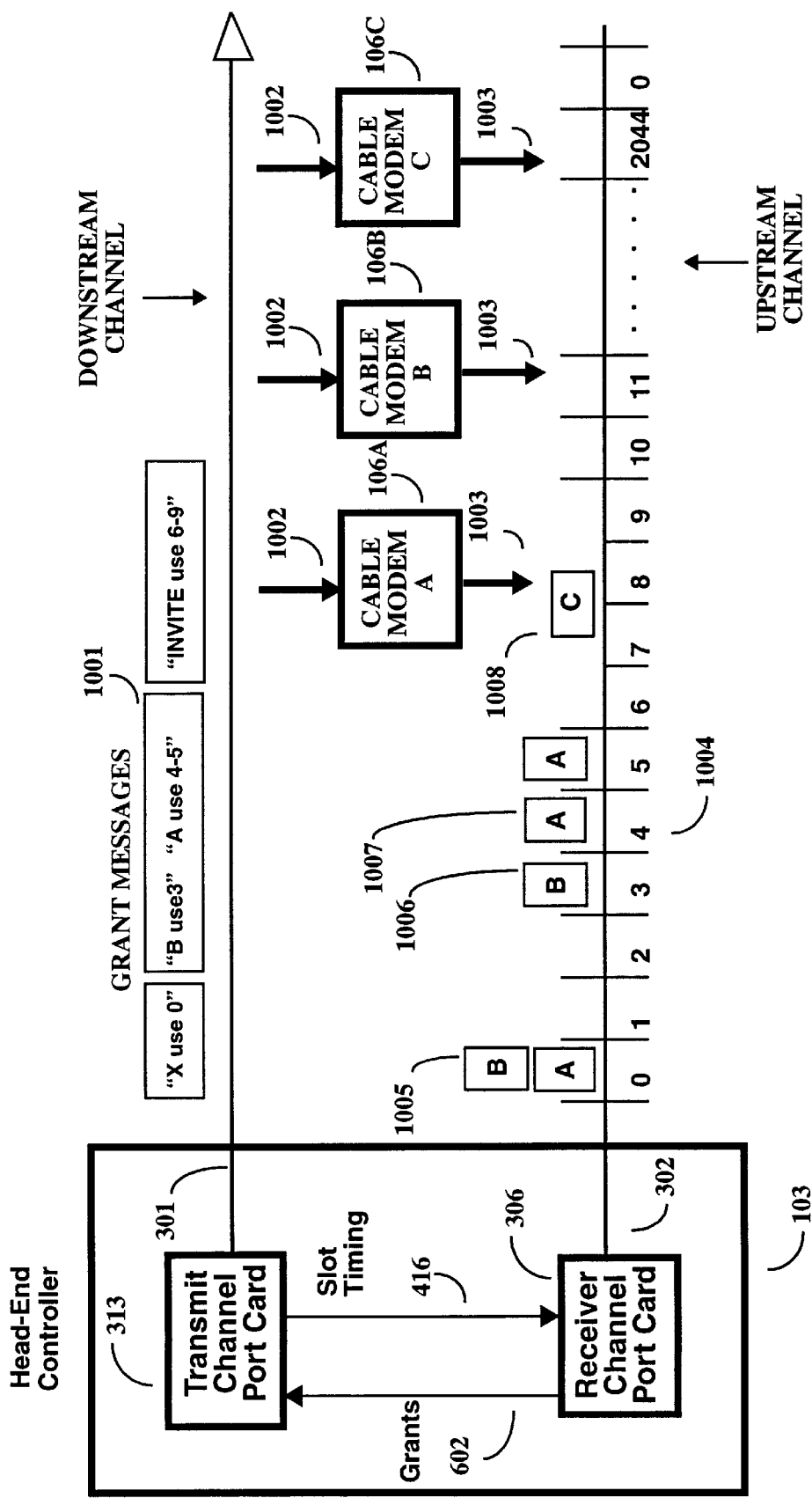
FIG. 10 schematically illustrates an Upstream Channel that has been organized into slots which may be assigned for the transmission of ATM cells from cable modems.

FIG. 10 schematically illustrates an Upstream Channel 302 that has been organized into slots 1004 which may be assigned for the transmission of ATM cells from cable modem A 106A, cable modem B 106B or cable modem C 106C. The slots on the upstream channel are numbered in ascending order beginning at 0 up to 2044 (decimal) and then the count is repeated starting at 0. In the present embodiment a protocol is being used to issue grants in the system. However, the same notion, can be applied to other protocols, not specifically ATM. It should be appreciated that one skilled in the art could easily configure the present invention in embodiments involving systems other than ATM and not just in upstream transmissions. For example, the present invention can work with any CATV based or wireless based protocol.

The present embodiment depicted in FIG. 10 teaches a basic method of grants and shows how to exploit this mechanism to control the RPM 701. Headend Communication Controller 103 is shown. In the present embodiment Headend Communication Controller 103 comprises a Transmit Channel Port Card 313 and a Receiver Channel Port Card 306. It should be appreciated that all the parts and components of Headend Communication Controller 103 are not shown so as to not unnecessarily obscure the invention. For example the ATM switch is not shown. Transmit Channel Port Card 313 is coupled to output 301. Receiver Channel Port card 306 is coupled to signal line 302 and receives signals via line 302. The Receiver Channel Port Card 306 issues grants on line 602 which are actually sent to the Transmit Channel Port Card 313 for transmission on the down stream. The slot timing information from the Transmit Channel Port Card 313 to the Receiver Channel Port Card is shown by line 416. This is fundamental to the operation of the present embodiment, and actually establishes a dependency between the Transmit Channel Port Card and the Receiver Channel Port Card for timing information.

Grant messages 1001 are sent on the downstream channel 301 and are received by each of cable modems 106A through 106C. The upstream channel 1004 is divided into slots. In the preferred embodiment the slots are a fixed size. However, it should be appreciated that there are other alternatives that use variable size slots. Slots are numbered staring at 0 and going up to some set number (in the present embodiment 2044), at this point they repeat back to zero again and repeat the cycle. It is in effect a cyclical assignment. The Receiver Channel Port Card arbitrates and allocates bandwidth to the cable modems that are talking on the upstream channel by issuing grant messages.

Grant messages fall into one of three possible types, a contention grant, a direct grant, and an invitation grant. In the present embodiment there is a contention grant, which is identified by the message "X use zero". A contention grant indicates that any station which is in the contention state is allowed to transmit a packet in the identified slot. In the present embodiment the identified slot is slot number 0. The contention grant slot 1005 shows cable modem A and cable modem B transmitting at the same time in slot 0. It is actually a collision of packets and demonstrates that multiple stations can be transmitting at one time. A uses 4 and 5 shows an example where cable modem A has placed two packets in slots 4 and 5 identified by 1007 according to the grant information that was given. Basically, a grant gives permission for one or more cable modems to use the upstream channel. Grant processing by the cable modem is dependent on the cable modem protocol state. A grant therefore designates a cable modem via contention, direct, or acquisition grants. The designated cable modem interprets the received grant based on its particular protocol state.

The second message actually contains two direct grants. The first direct grant message "B use 3" permits cable modem B to transmit a packet in slot 3, direct grant slot 1006. It is called a direct grant because no other cable modem is given permission to transmit in slot 3. The direct grant message "A use 4 and 5" allows the cable modem A to use 1007 (slots 4 and 5) and no other cable modem can use slots 4 and 5.

There is a third type of grant called an invitation grant or invite grant and is used to bring new stations on line. The purpose of the invite grant is to permit a station that has not been ranged yet, that is, its slot boundaries have not been determined yet, to transmit on the system. In the present embodiment cable modem C 106C is a new station. It receives the grant message "invite use 6 to 9" which is part of the protocol that indicates all new stations can signal and get attention from the Headend Communication Controller 103 by dropping a message in slots 6 through 9. In the upstream channel there is a wide area left open between slots 6, 7, 8 & 9 for station C. In the present embodiment station C actually transmits a packet 1008. In the present embodiment packet 1008 fell between the boundaries of slots 7 and 8. This is an example of opening up a window in the upstream bandwidth to allow a station that is not yet ranged in terms of timing or slot boundaries, to be able to send a packet up through Receiver Channel Port Card 103 to begin the process of logging into the system.

Figure 11:
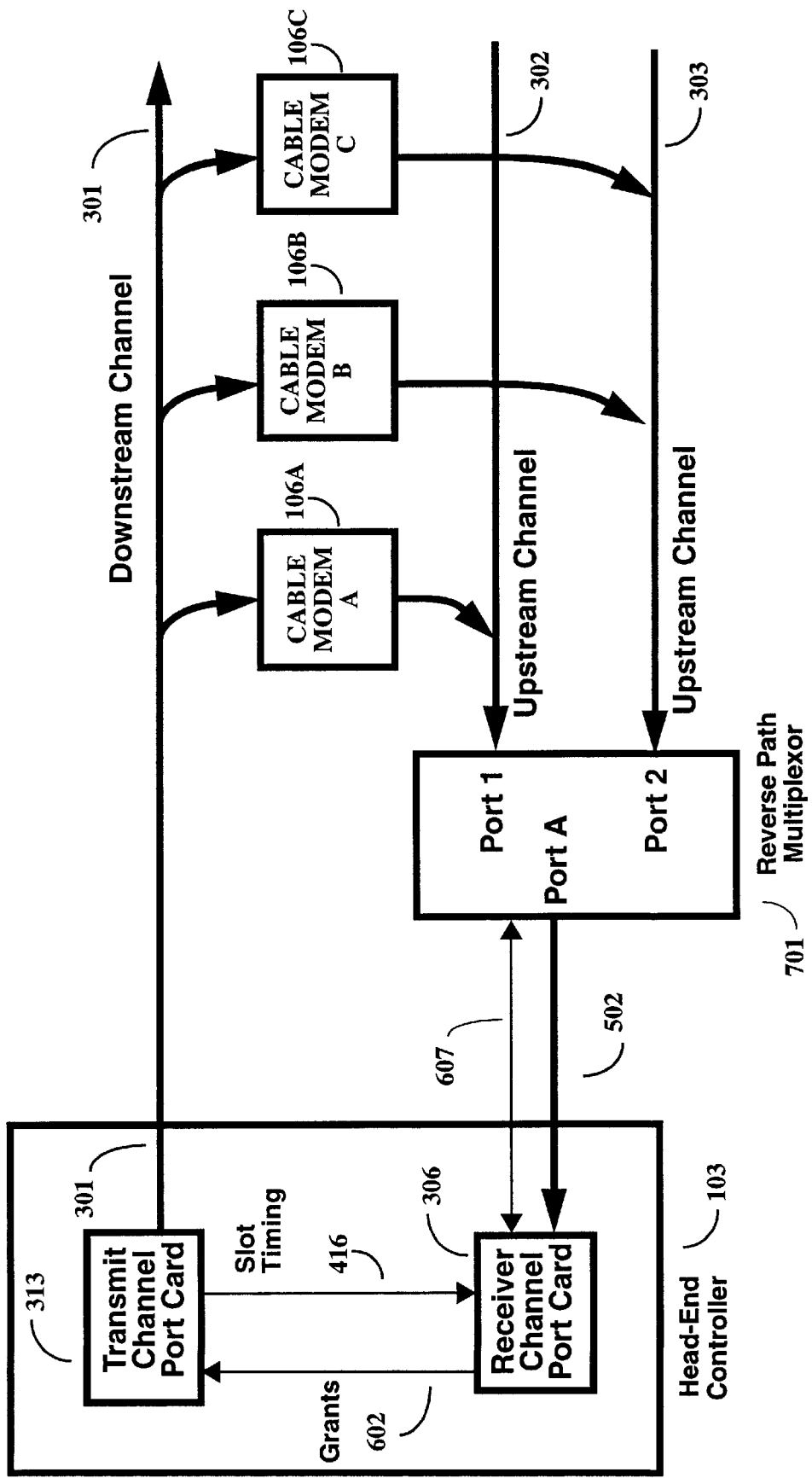
FIG. 11 shows a connection scheme for one embodiment of the present invention.

FIG. 11 shows a connection scheme for one embodiment of the present invention. A Headend Communication Controller 103 is coupled to cable modem A 106A, cable modem B 106B, cable modem C 106C via downstream channel 301. Headend Communication Controller 103 is coupled to RPM 701 via line 607 and RF Input Signal line 502. Only two ports (1 and 4) on PRM 701 are shown so as not to unnecessarily obscure the invention. It should be appreciate that other embodiments of the present invention could readily include multiple ports. Cable modem A 106A is coupled to RPM 701 Port 1 via upstream channel 302. Cable modem B 106B is coupled to RPM 701 Port 2 via upstream channel 303. Cable modem C 106C is coupled to RPM 701 Port 2 via upstream channel 303.

Figure 12:
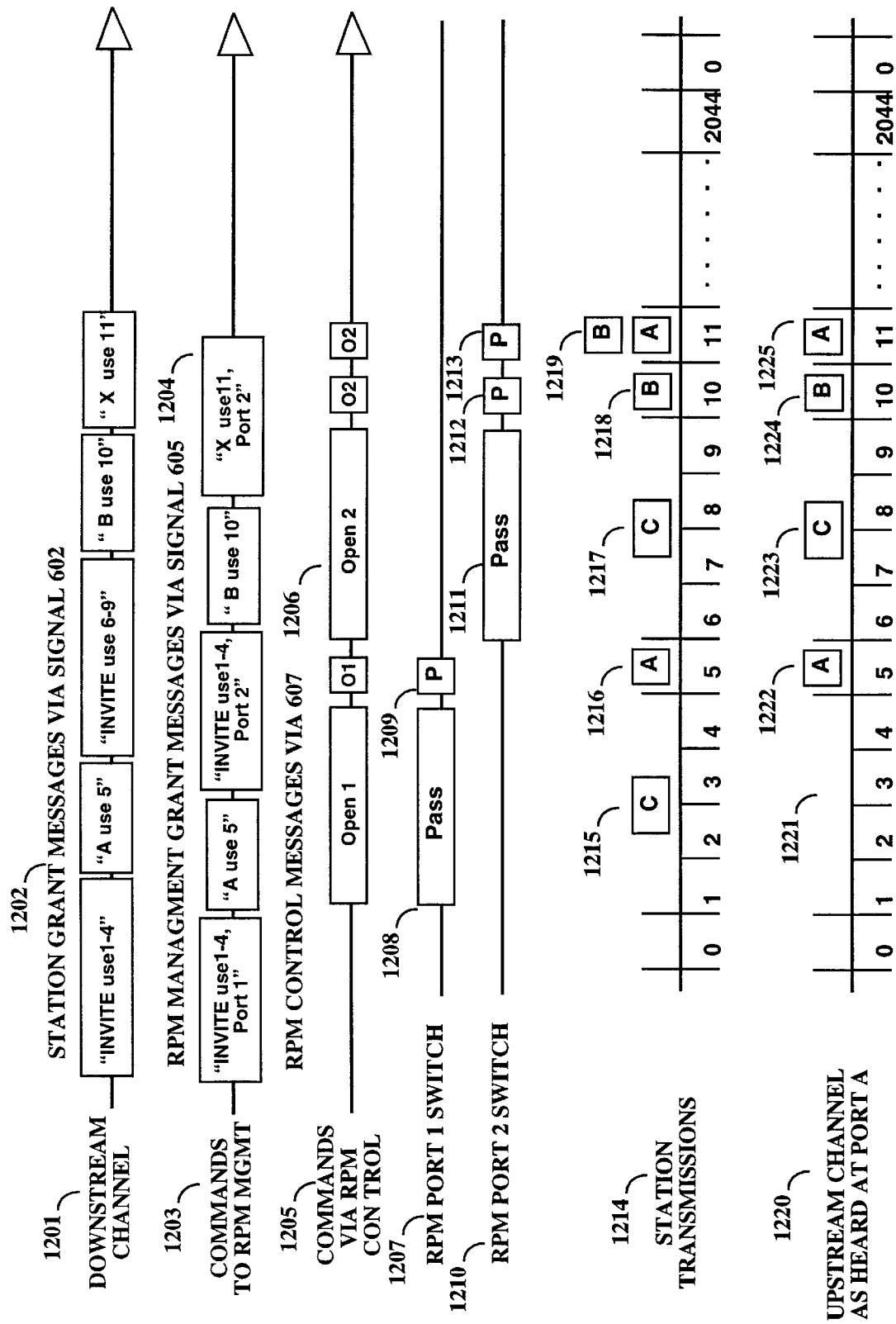
FIG. 12 shows a graphical representation of the operating sequence of one embodiment of the system.

FIG. 12 shows a graphical representation of the operating sequence of one embodiment of the system. The operational sequence is depicted on a time lines. Time line 1201 depicts downstream channel activities. Time line 1203 depicts commands issued to RPM management module in RPM control component 603. Time line 1205 depicts commands issued from RPM control component 603 to RPM 701 via RPM control line 607. Time line 1207 depicts the activities of Port switch 1. Time line 1210 depicts the activities of RPM port switch 2. Time line 1214 indicates the station transmission activities. Time line 1220 indicates the upstream channel data as actually received at Port A. Each of these time lines are discussed in further detail below.

Time line 1201 shows the sequence of grant messages in the present embodiment. The receiver port card issues a series of five grant messages issues, comprising the sequence 1202, on downstream channel 102. These grant messages are actually sent via 602. The first grant message is "invite use 1–4" which is an invitation grant for all new stations to use slots 1 to 4. The second grant message is "A use 5", which is a direct grant instructing cable modem A to place its transmission in slot 5. The third grant message is "invite use 6–9", which indicates that any station can use slot 6 through 9 for new station acquisition registration. The forth grant message is "B use 10", a direct grant for station B to use slot 10. The fifth grant message is "X use 11", a contention grant indicating any device may use slot 11.

Time line 1203 shows commands issued to RPM control component 603, corresponding to the grant messages. Grant and port number signal on line 605 are sent from the traffic scheduler 601, to the RPM management function 603. Thus, in the present embodiment the traffic scheduler, while issuing grants to the downstream stations, is also issuing the grants to the RPM management module in 603. The first grant message is an invitation for use of slots 1 through 4 and an instruction to the RPM to open up port 1. The second grant indicates "A use 5". Since there is no instruction regarding which port to open, there must be a previous association formed in the table in 603, such that cable modem A has been associated with Port 1. The third grant is an invitation grant indicating a new device should use slot 6 to 9. The third grant also indicates port 2 should be opened to receive any such transmissions. The forth grant message "B use slot 10", indicates that in the station port table in module 603 there has been an association of station B to Port 2. The fifth grant is a contention grant message "use slot 11", and the traffic scheduler is indicating that port 2 should be opened for this contention grant.

The next line 1205 is a sequence of open messages commands sent from the RPM Control Function Module to the RPM via line 607. The message open 1" or "O1" indicates that the RPM should open port 1 and the message "open 2" or "O2" indicates that the RPM should open port 2. In the present embodiment only open messages are shown so as not to unnecessarily obscure the invention. It should be appreciated that one skilled in the art would readily recognize that other embodiments of the present invention could easily include messages to close port 1 or close port 2, or commands to open port 1 and port 2 or multiples of similar commands.

The commands that are actually being sent in real time are aligned to the slots on the system. It is the RPM management function module 603's responsibility to ensure this occurs. For example, in the present embodiment the RPM management function module 603 sends commands to the RPM indicating port 1 should be opened for a four slot period of time. Then the RPM opens port 1 for a one slot period of time, and then it opens port 2 for a four slot period of time. Then it opens port 2 for a 1 slot period of time, after which it opens port 2 for a one slot period of time.

The operation of RPM port 1 switch is represented by line 1207. The time frames that RPM port 1 is passing RP signals in the present embodiment are identified by items 1208 and 1209. In item 1208 RPM is passing RF signals for a time period corresponding to four slots 1 through 4. In item 1209 RPM is passing RP signals for a time period corresponding to one slot number 5.

The operation of RPM port 2 switch is represented by line 1210. The time frames that RPM port 2 is passing RF signals in the present embodiment are identified by items 1211, 1212 and 1213. In item 1211 RPM is passing RF signals for a time period corresponding to four slots 6 through 9. In item 1212 RPM is passing RF signals for a time period corresponding to one slot number 10. In item 1213 RPM is passing RF signals for a time period corresponding to one slot number 11. Comparing the operation of RPM port 1 depicted on line 1207 and RPM port switch 2 depicted on line 1210, it is apparent that in the present embodiment the RPM Port 2 Switch is closed during the time the RPM Port 1 switch is open and vise versa.

Time line 1214 indicates the station transmission activities. The station or cable modem A 106A, cable modem B 106B and cable modem C 106C transmit when they receive a grant. Cable modem A 106A transmits via upstream channel 302 to Port 1 in RPM 701. Cable modem A 106A attempts transmission 1216 and 1219. Cable modem B 106B transmits via upstream channel 303 to Port 2 in RPM 701. Cable modem B 106B attempts transmission 1218 and 1219. Cable modem C 106C transmits via upstream channel 303 to Port 2 in RPM 701. Cable modem C 106C attempts transmission 1215 and 1217.

The first transmission 1215 corresponds to the first RPM management grant message. The first RPM management grant message indicates that any new station may attempt to transmit its initial invitation responses or acquisition message through port 1. In the present embodiment cable modem C is a new station to the system. However, cable modem C doesn't "know" which port it is on. In fact the use of RPM is completely transparent to a cable modem. Thus, cable modem C processes the invitation grant and it still processes transmission 1215 in slot 1 to 4. However, in accordance with the present embodiment cable modem C is on port 2 (see FIG. 11) and the transmission did not go through to the receiver channel port card.

The next transmission 1216 from cable modem A in slot 5 is processed. As indicated previously cable modem A was associated with Port 1. Therefore, the RPM control directed RPM to open up port 1 and allow the transmission from A to pass through.

The next grant is a invitation to new devices and since Cable Modem C has not completed a transmission to a receiving channel port card, Cable Modem C is still a new station and transmits again. This time the traffic scheduler has directed that port 2 be opened for this invitation. Because Cable modem C is on port 2 its invitation message 1123 is passed through. received by the receiver channel port card. Now because of the feed back line 604 representing the current port number that is open from the RPM management the receiver port card traffic scheduler knows it has heard traffic from Cable Modem C and it also knows what port of the RPM it heard it on. It then takes that information and configures that information visa the management signal 606 to establish a relationship between Cable Modem C and port 2 in the 603 function the station port table management.

The direct grant of Cable Modem B to use slot 10 again follows the pre-discovered information that Cable Modem B is on port 2. So the RPM control 603 directs the RPM to open up port 2 is identified in item 1212 to allow the transmission from modem b to be received by the receiver channel port card.

The last grant is a contention grant that says use slot 11. In this particular case the traffic scheduler has only directed that port 2 be open for the contention grant. Both cable modem A and cable modem B have something to send but since port 2 is the only port open and Cable modem b is connected to port 2 and Cable modem A is not, cable modem B is able to transmit. The transmission on Port 1 by cable modem A was not heard since the switch at port 1 was not open.

Time line 1220 indicates the upstream channel data as actually received at Port A. The receiver port card did not receive the first transmission of the packet from C at 1221 in slots 1 through 4 because the RPM Port 2 switch was closed. The receiver port card did receive the transmission 1216 because the RPM control directed RPM to open up port 1 and allow the transmission from A to pass through to the receiver card as shown at item 1222 at slot 5. Transmission 1217 did get through to the receiver port card because the RPM control directed RPM to open up port 2 and thus the transmission from C was able to pass through to the receiver card as shown at item 1223 at slots 6 through 9. The receiver port card did receive the transmission 1218 as shown at item 1224 at slot 10. Transmission 1219 from B got through to the receiver port card as shown by 1125 at slot 11. However the transmission 1219 from A did not get through because port 2 was open and A is coupled to port 1.

Figure 13:
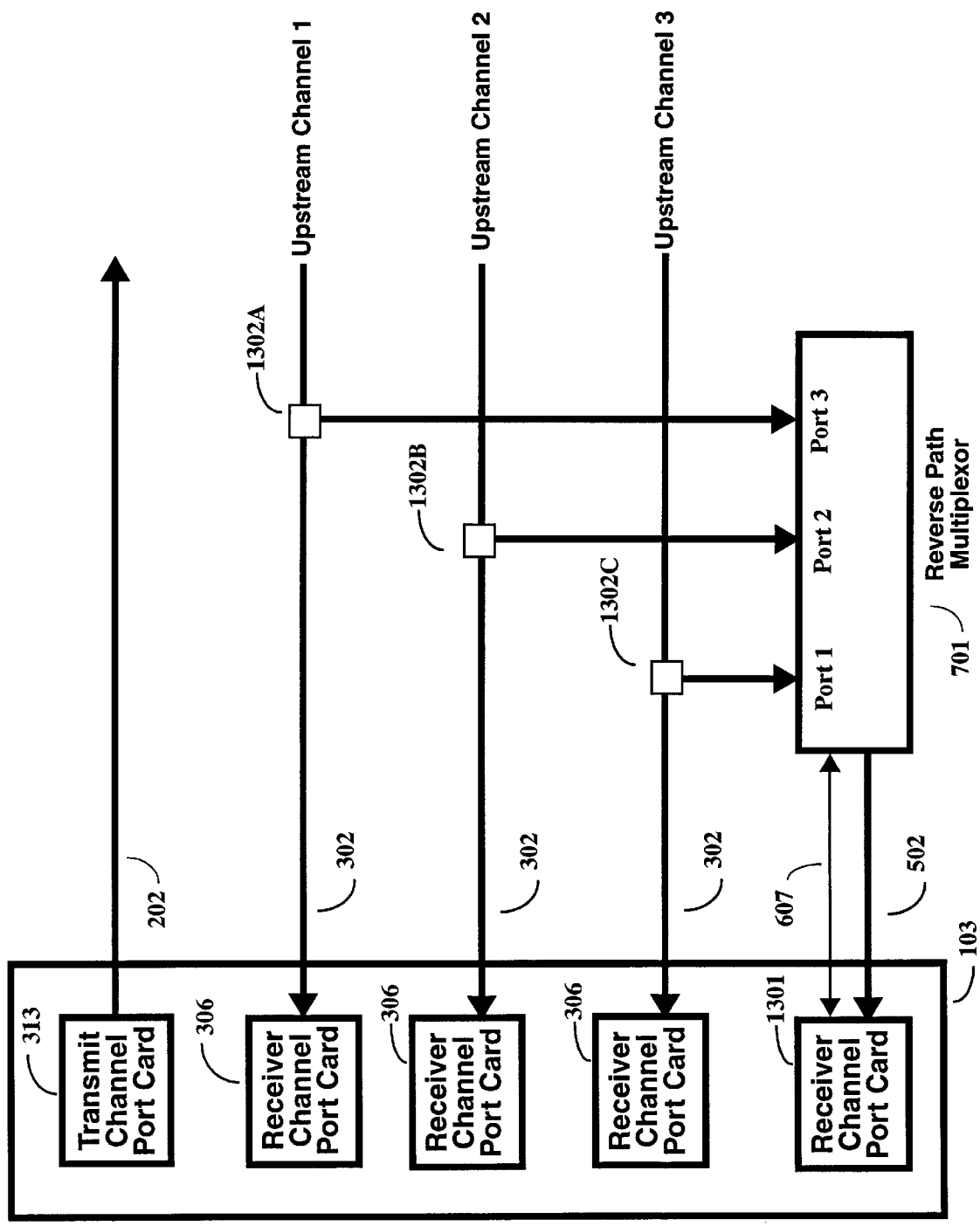
FIG. 13 shows an embodiment of the present invention that includes a redundant backup Receiver Channel Port Card.

FIG. 13 shows an embodiment of the present invention that includes a redundant backup Receiver Channel Port Card 1301. A Headend Communication Controller 103 comprising one Transmitter Channel Port Card 313, three Receiver Channel Port Cards 306A through 306C, an additional Receiver Channel Port Card 1301 which is used as a redundant backup receiver to any of the other Receiver Channel Port Cards 306A through 306C. Headend Communication Controller 103 is coupled to Upstream Channel 1, Upstream Channel 2, Upstream Channel 3, Downstream Channel 202, line 607 and RF Input line 502. Line 607 and RF Input line 502 are coupled to RPM 701. Upstream Channel 1 is coupled to Port 3 via splitter 1302C. Upstream Channel 2 is coupled to Port 2 via splitter 1302B. Upstream channel 1 is coupled to Port 1 via splitter 1302A. In this mode of operation, the RPM 701 allows Receiver Channel Port Card 1301 to sit in standby mode, such that if a Receiver Channel Port Card 306A through 306C fails or if testing the quality of signals for failure analysis the Receiver Channel Port Card 1301 can direct the RPM 701 to open Port 1, Port 2 or Port 3. This feature provides the advantage of acting as a stand by receiver for redundancy and it also has the ability to act as a second receiver port card for validating signal quality. The primary purpose of the redundant Receiver Channel Port Card 1301 in the present embodiment is to improve reliability.

Figure 14:
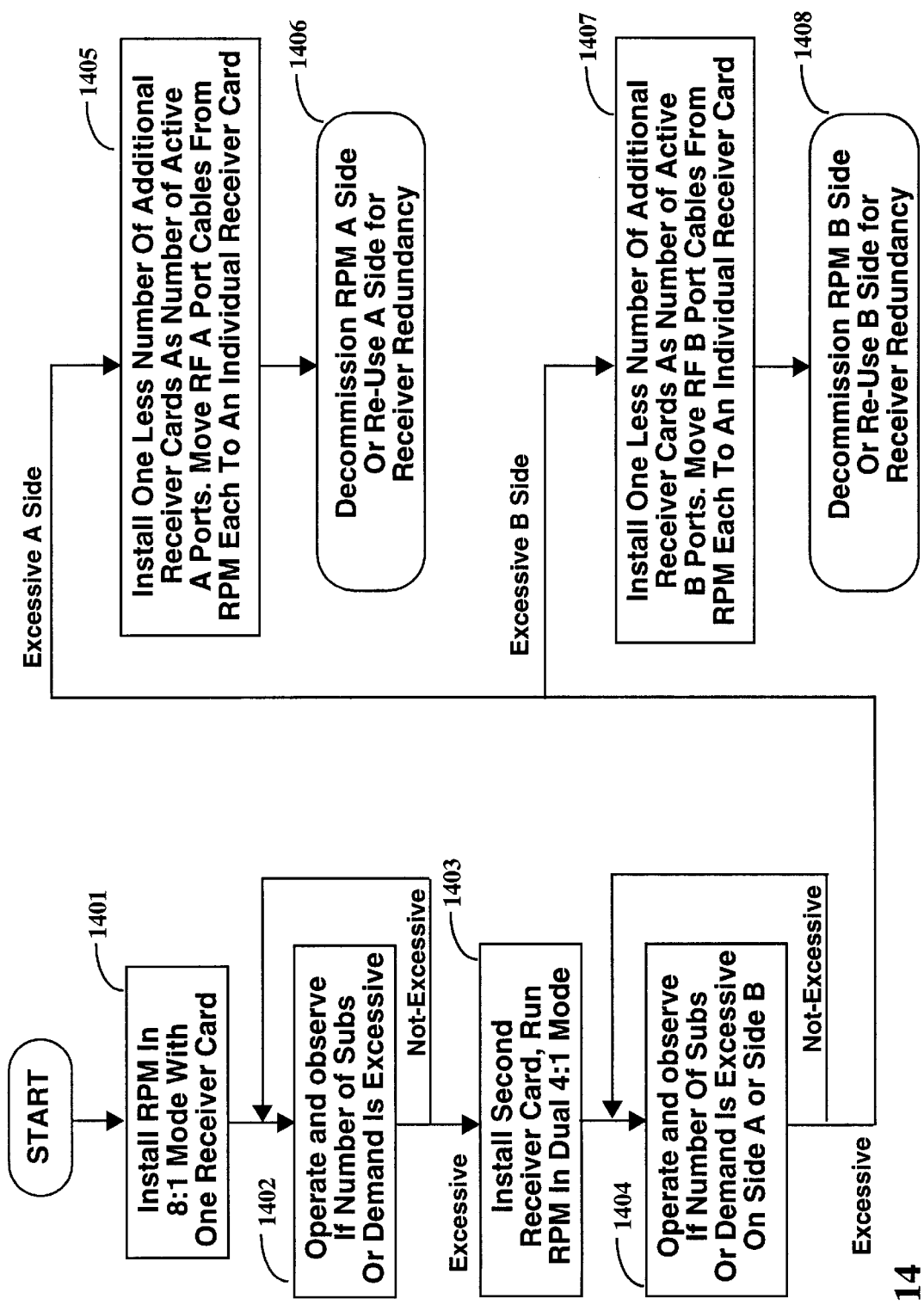
FIG. 14 shows the flow chart for the preferred method of installing an RPM and the subsequent addition of new receiver cards and the splitting of the RPM multiplexing function.

FIG. 14 shows the flow chart for the preferred method of installing an RPM and the subsequent addition of new receiver cards and the splitting of the RPM multiplexing function. The start of the method begins with installing an RPM in 8:1 multiplexing mode using one receiver card in the CMTS, step 1401. During operation of the system, the cable operator or CMTS network management will observe at unspecified intervals whether the number of cable modems (subscribers) or the demand (services requested by subscribers) exceeds the operational capacity of the one receiver card, step 1402. Specifically, more bandwidth may be requested via the one receiver card or a large number of subscribers may be using the card and experiencing unacceptable delays. If the capacity demand or number of subscribers is not excessive, the one receiver card may continued to be used for providing services. However, if the capacity demand is excessive, the cable operator will need to increase the receiver capacity of the system. To accomplish this, a second receiver card is installed, and the RPM is placed into dual 4:1 multiplexing (split) mode, step 1403. This immediately increases the performance of the CMTS system. During operation of this configuration, the cable operator or CMTS network management system will observe at unspecified intervals whether the number of cable modems (subscribers) or the demand (services requested by subscribers) exceeds the operational capacity either A side receiver card or the B side receiver card, step 1404. If capacity is not excessive, the A side or B side continues to operate as is. If the capacity demand is excessive on the A side, the cable operator will need to increase the receiver capacity of the system for the A side upstream return ports. To accomplish this, additional receiver cards are installed sufficient to connect each A side upstream port directly to its own receiver card, step 1405. As one card has already been service, one card less than the total number of connect A ports is necessary to be installed. The cables are moved from the A side upstream ports of the RPM and connected directly to the receiver cards. This decommissions the A side of the RPM, step 1406. If the capacity demand is excessive on the B side, the cable operator will need to increase the receiver capacity of the system for the B side upstream return ports. To accomplish this, additional receiver cards are installed sufficient to connect each B side upstream port directly to its own receiver card, step 1407. As one card has already been service, one card less than the total number of connect B ports is necessary to be installed. The cables are moved from the B side upstream ports of the RPM and connected directly to the receiver cards. This decommissions the B side of the RPM, step 1408. A decommissioned A or B side, or entire RPM may be used for N:1 receiver port redundancy as previously described in FIG. 13.

In the preferred embodiment it is expected that all 8 ports of the RPM will be connected to the upstream cable plant however, one skilled in the art will understand that less than 8 ports may be connected to the RPM when in 8:1 mode, or less than four ports may be connected on either the A side or the B side when in dual (split) 4:1 mode. Also note that in the preferred embodiment, additional upstream capacity was achieved by adding and additional receiver card. It is also possible to increase capacity by removing a receiver card and replacing it with a card of larger capacity; e.g. increasing the size of the upstream channel from 2.56 Mbps to 5.12 Mbps. This requires that each cable modem be compatible with the features of the new card. It should be noted that any combination of new cards or replacement cards of higher capacity can be supported by the RPM.

Figure 15:
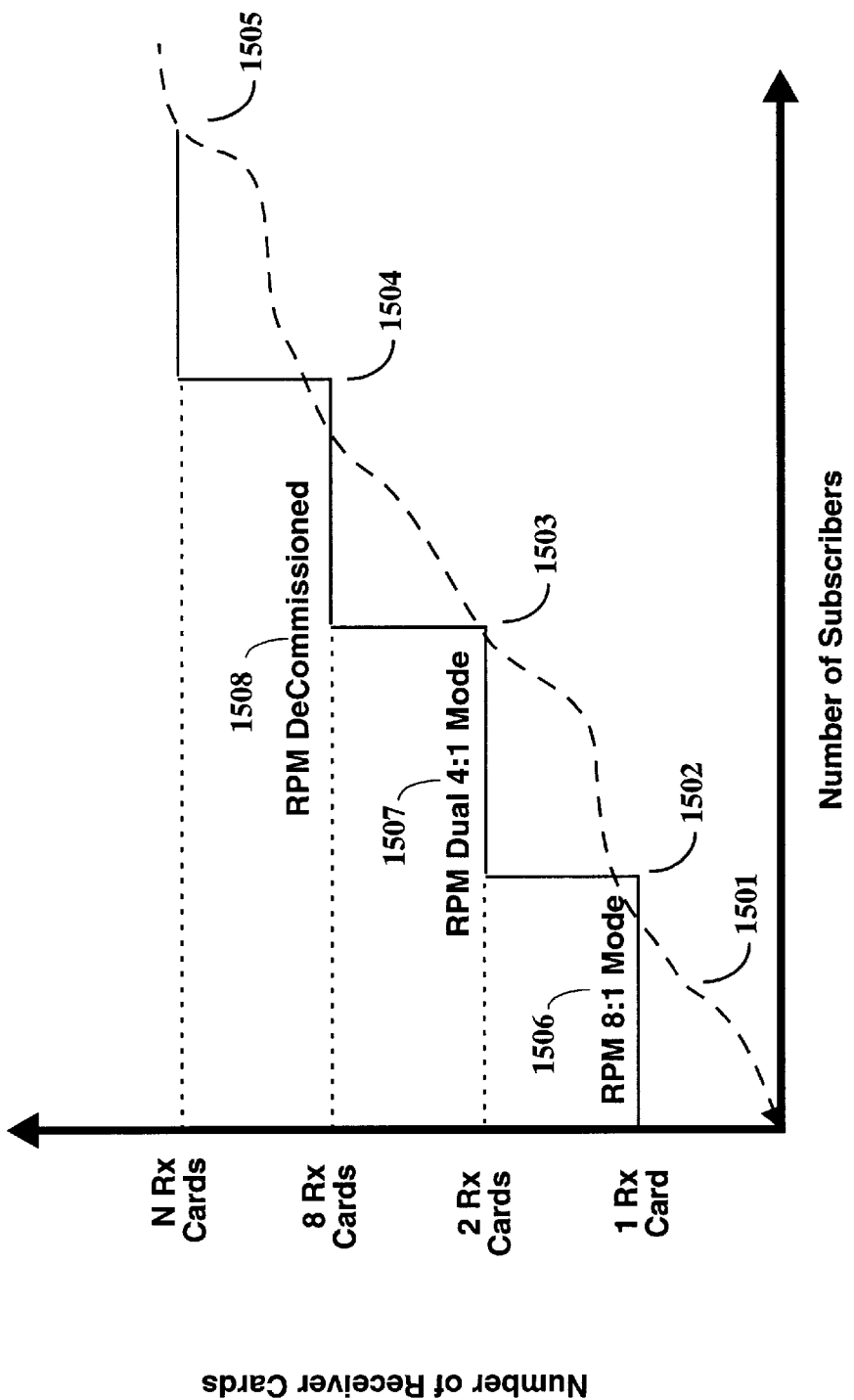
FIG. 15 is a pictoral representation of the step wise growth in subscribers of a CMTS which is initially configured with a single receiver card and an RPM in 8:1 mode.

Also note that the preferred method provides for the ability of the cable operator to incrementally scale up system capacity while splitting RPM functionality. The specific method presented in this invention is representative of several types of methods which achieve the same results. FIG. 15 is a pictoral representation of the step wise growth in subscribers of a CMTS which is initially configured with a single receiver card and an RPM in 8:1 mode. The representative growth of the system may follow curve 1501. At some point, the number of subscribers will exceed the capability of the single receiver card and 8:1 RPM mode 1506 and the cable operator will make a decision when to add additional capacity into the CMTS 1502. The installation of a second receiver card and the RPM in split 4:1 modem 1507 allows the number of subscribers in the system to grow to the new capacity 1503 before another incremental growth step is needed. After the split 4:1 mode, the RPM is decommissioned 1508 and the cable operator may go to eight receiver cards until such a time as more cards are need 1504 and 1505. This graph represents a possible incremental subscriber growth scenario out of many that the cable operator may follow.

Figure 16:
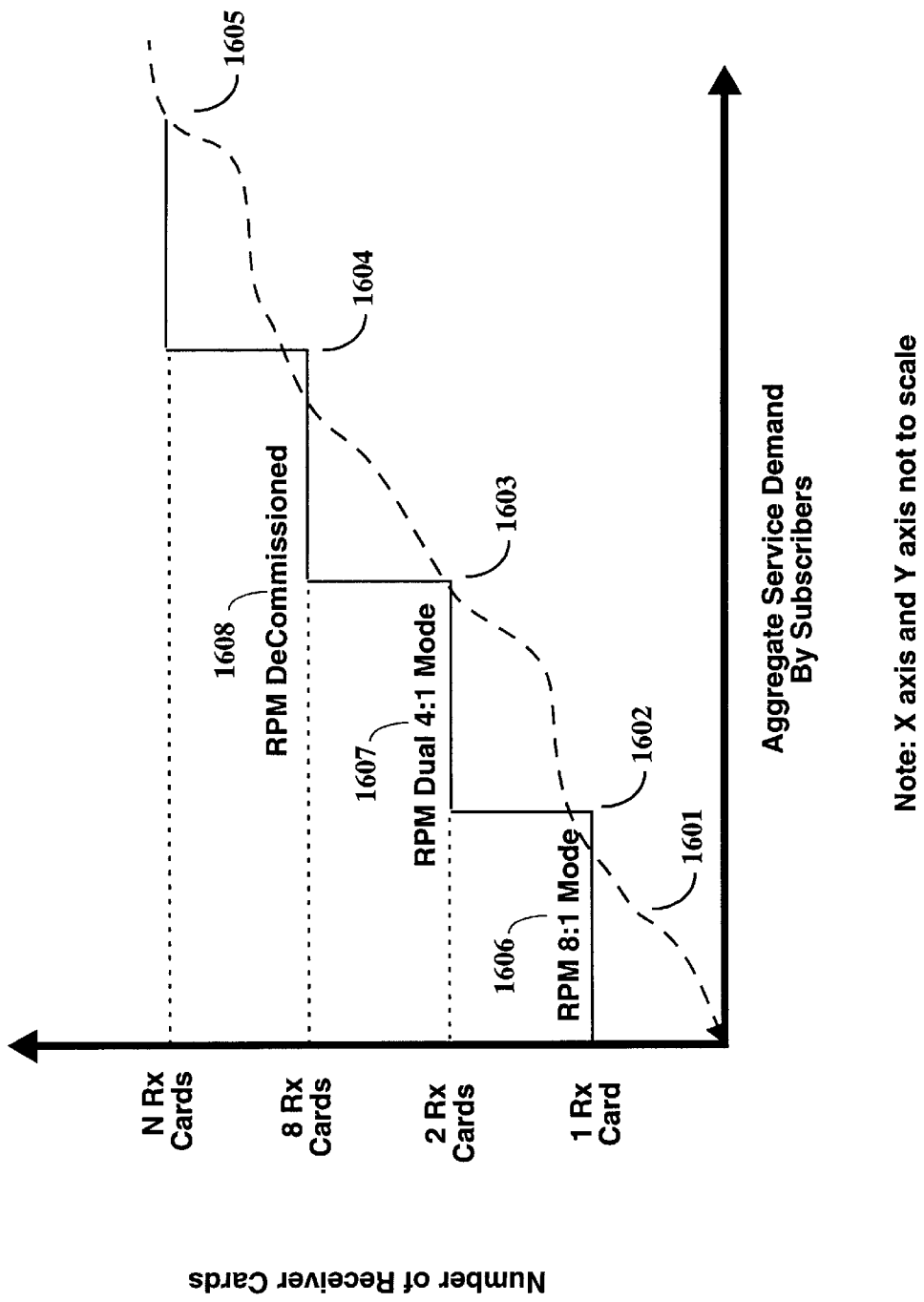
FIG. 16 is a pictoral representation of the step wise growth in service demand of a CMTS which is initially configured with a single receiver card and an RPM in 8:1 mode.

FIG. 16 is a pictoral representation of the step wise growth in service demand of a CMTS which is initially configured with a single receiver card and an RPM in 8:1 mode. The representative growth of the system may follow curve 1601. At some point, the service demand will exceed the capability of the single receiver card and 8:1 RPM mode 1606 and the cable operator will make a decision when to add additional capacity into the CMTS 1602. The installation of a second receiver card and the RPM in split 4:1 modem 1607 allows the delivered service in the system to grow to the new capacity 1603 before another incremental growth step is needed. After the split 4:1 mode, the RPM is decommissioned 1608 and the cable operator may go to eight receiver cards until such a time as more cards are need 1604 and 1605. This graph represents a possible incremental service capacity growth scenario out of many that the cable operator may follow.

The present invention is a novel Reverse Path Multiplexer method and system which provides a novel way of introducing new stations into a CATV system without human intervention. The present invention provides a method and system for ensuring greater reliability by providing redundancy and mechanisms to assist in testing the system. In addition the present invention permits implementation of a prioritized packet to ATM cell bi-, directional transmission between a Headend Communication Controller and multiple station terminal units via a Reverse Path Multiplexer over a cable network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An apparatus for upstream signal selection, comprising:
    a first equalization circuit for processing a first upstream signal from a first port generating a first processed signal;
    a reverse path multiplexer comprising:
        a first switch for selecting the first processed signal;
        a second equalization circuit for processing a second upstream signal from a second port generating a second processed signal;
        a second switch for selecting the second processed signal;
        a first signal selection controller for controlling the first switch and the second switch;
        a first gain circuit for controlling signal gain of the first processed signal;
        a first port manager for instructing the first signal selection controller for controlling signal selection;
        a first traffic scheduler which identifies a port for receiving signals from a designated cable modem.

2. The apparatus of claim 1, wherein the identified port is associated with the designated cable modem during a registration process.

\* \* \* \* \*